United States Patent
Kishikawa et al.

(10) Patent No.: US 10,992,688 B2
(45) Date of Patent: Apr. 27, 2021

(54) UNAUTHORIZED ACTIVITY DETECTION METHOD, MONITORING ELECTRONIC CONTROL UNIT, AND ONBOARD NETWORK SYSTEM

(71) Applicant: Panasonic Intellectual Property Corporation of America, Torrance, CA (US)

(72) Inventors: Takeshi Kishikawa, Osaka (JP); Yoshihiro Ujiie, Osaka (JP); Jun Anzai, Kanagawa (JP); Hideki Matsushima, Osaka (JP); Masato Tanabe, Aichi (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 218 days.

(21) Appl. No.: 16/011,677

(22) Filed: Jun. 19, 2018

(65) Prior Publication Data

US 2018/0302422 A1 Oct. 18, 2018

Related U.S. Application Data

(63) Continuation of application No. PCT/JP2016/004993, filed on Nov. 29, 2016.

(30) Foreign Application Priority Data

Oct. 24, 2016 (JP) .............................. JP2016-208084

(51) Int. Cl.
*H04L 29/06* (2006.01)
*B60W 50/14* (2020.01)
(Continued)

(52) U.S. Cl.
CPC ......... *H04L 63/1416* (2013.01); *B60W 50/14* (2013.01); *H04L 9/002* (2013.01);
(Continued)

(58) Field of Classification Search
None
See application file for complete search history.

(56) References Cited

U.S. PATENT DOCUMENTS

2009/0262650 A1* 10/2009 Shaikh ................ H04L 41/0631
370/242
2014/0310530 A1* 10/2014 Oguma ................. H04L 9/3242
713/181

(Continued)

FOREIGN PATENT DOCUMENTS

CN          105050868 A       11/2015
JP          2013-043575        3/2013
(Continued)

OTHER PUBLICATIONS

The Extended European Search Report dated Nov. 13, 2019 for European Patent Application No. 16883533.8.
(Continued)

*Primary Examiner* — Henry Tsang
(74) *Attorney, Agent, or Firm* — Greenblum & Bernstein, P.L.C.

(57) ABSTRACT

An unauthorized activity detection method is provided in an onboard network system having multiple electronic units (ECU) that perform communication via a bus, such that an occurrence of an unauthorized state can be detected by monitoring frames transmitted over the bus. The unauthorized activity detection method determines, by a monitoring electronic control unit using unauthorized activity detection rule information indicating a first condition, whether or not a set of frames received from the bus satisfies the first (Continued)

condition. The first condition being a condition regarding a relation in content between a first frame having a first identifier and a second frame having a second identifier that differs from the first identifier. And the method further detects the occurrence of the unauthorized state in a case where the first condition is not satisfied.

18 Claims, 26 Drawing Sheets

Related U.S. Application Data

(60) Provisional application No. 62/276,400, filed on Jan. 8, 2016.

(51) Int. Cl.
*H04L 9/32* (2006.01)
*H04L 12/40* (2006.01)
*H04L 12/26* (2006.01)
*H04L 29/08* (2006.01)
*H04L 12/28* (2006.01)
*H04L 9/08* (2006.01)
*H04L 9/00* (2006.01)

(52) U.S. Cl.
CPC .......... *H04L 9/0891* (2013.01); *H04L 9/3271* (2013.01); *H04L 12/28* (2013.01); *H04L 12/40* (2013.01); *H04L 43/062* (2013.01); *H04L 43/065* (2013.01); *H04L 63/123* (2013.01); *H04L 67/12* (2013.01); *H04L 2012/40215* (2013.01); *H04L 2012/40273* (2013.01); *H04L 2209/84* (2013.01)

(56) References Cited

U.S. PATENT DOCUMENTS

| | | | |
|---|---|---|---|
| 2014/0328352 | A1 | 11/2014 | Mabuchi et al. |
| 2015/0066239 | A1* | 3/2015 | Mabuchi ............ H04L 63/1408 701/1 |
| 2015/0089236 | A1* | 3/2015 | Han ...................... H04L 9/3271 713/181 |
| 2015/0172298 | A1* | 6/2015 | Otsuka .................... H04L 63/08 726/30 |
| 2015/0271201 | A1* | 9/2015 | Ruvio ................. H04L 63/1408 726/23 |
| 2015/0358351 | A1 | 12/2015 | Otsuka et al. |
| 2016/0205194 | A1 | 7/2016 | Kishikawa et al. |
| 2016/0219413 | A1* | 7/2016 | Mabuchi ................ H04W 4/44 |
| 2016/0224806 | A1 | 8/2016 | Takada et al. |
| 2017/0041764 | A1* | 2/2017 | Nizgoda ............ H04M 1/72572 |
| 2018/0196941 | A1* | 7/2018 | Ruvio ............... H04W 12/1208 |

FOREIGN PATENT DOCUMENTS

| | | |
|---|---|---|
| JP | 2014-146868 | 8/2014 |
| WO | 2013/094072 | 6/2013 |
| WO | 2014/061021 A1 | 4/2014 |
| WO | 2105/041161 | 3/2015 |
| WO | 2015/170451 A1 | 11/2015 |

OTHER PUBLICATIONS

International Search Report of PCT application No. PCT/JP2016/004993 dated Feb. 28, 2017.
Diane Kelly, Hideo Joho et al. trans., "Methods for Evaluating Interactive Information Retrieval Systems with Users", Maruzen Publishing Co. Ltd, Apr. 2013, pp. 168-169.
The Extended European Search Report dated Dec. 7, 2018 for European Patent Application No. 16883533.8.
English Translation of Chinese Search Report dated Jun. 2, 2020 for Chinese Patent Application No. 201680051842.7.

* cited by examiner

FIG. 5

| ID | NEWEST | ONE TIME BACK | TWO TIMES BACK | THREE TIMES BACK |
|---|---|---|---|---|
| 0x100 (VEHICLE SPEED) | 18.0 (km/h) | 19.2 | 19.6 | 20.0 |
| 0x200 (ACCELERATION) | 0.10 (m/s$^2$) | 0.10 | 0.20 | 0.20 |
| 0x300 (GEARSHIFT POSITION) | D (DRIVE) | D | D | D |

FIG. 6

| RULE NO. | RULES | | |
|---|---|---|---|
| | ID | | RULES (RELATION) |
| 1 | 0x100 (VEHICLE SPEED) | 0x200 (ACCELERATION) | SPEED IS INTEGRATED VALUE OF ACCELERATION ± 1 |
| 2 | 0x100 (VEHICLE SPEED) | 0x300 (GEARSHIFT POSITION) | SPEED CHANGE WHEN IN D IS 1.0 OR LESS SPEED CHANGE WHEN IN R IS 0.5 OR LESS |
| 3 | 0x200 (ACCELERATION) | 0x300 (GEARSHIFT POSITION) | ACCELERATION CHANGE WHEN IN D IS 1.0 OR LESS ACCELERATION CHANGE WHEN IN R IS 0.5 OR LESS |

FIG. 7

| ID | 0x100 | 0x200 | 0x300 | DEGREE OF ABNORMALITY |
|---|---|---|---|---|
| 0x100 | | 1: UNAUTHORIZED | 2: UNAUTHORIZED | 2 |
| 0x200 | 1: UNAUTHORIZED | | 3: VALID | 1 |
| 0x300 | 2: UNAUTHORIZED | 3: VALID | | 1 |

FIG. 8

| ID | INFORMATION OF TRANSMISSION ECU |
|---|---|
| 0x100 | INFORMATION OF ECU 200a |
| 0x200 | INFORMATION OF ECU 200b |
| 0x300 | INFORMATION OF ECU 200c |

FIG. 10

401 — DATA FRAME THAT ECU200a TRANSMITS

| ID | DLC | DATA FIELD |
|---|---|---|
| 0x100 | 2 | 0x00  0xC8  (20.0) |

SPEED (IN INCREMENTS OF 0.1 km/h)

402 — DATA FRAME THAT ECU200b TRANSMITS

| ID | DLC | DATA FIELD |
|---|---|---|
| 0x200 | 2 | 0x00  0x0A  (0.10) |

ACCELERATION (IN INCREMENTS OF 0.01 m/s$^2$)

403 — DATA FRAME THAT ECU200c TRANSMITS

| ID | DLC | DATA FIELD |
|---|---|---|
| 0x300 | 1 | 0x02 |

GEARSHIFT POSITION
NEUTRAL: 0
REVERSE: 1
DRIVE  : 2

FIG. 15

| ID | NEWEST | | ONE TIME BACK | | TWO TIMES BACK | |
|---|---|---|---|---|---|---|
| | TIME | VALUE | TIME | VALUE | TIME | VALUE |
| 0x100 (VEHICLE SPEED) | 210 (ms) | 18.0 (km/h) | 110 | 19.2 | 10 | 19.6 |
| 0x200 (ACCELERATION) | 220 (ms) | 0.10 (m/s$^2$) | 120 | 0.10 | 20 | 0.20 |
| 0x300 (GEARSHIFT POSITION) | 230 (ms) | D (DRIVE) | 130 | D | 30 | D |

FIG. 16

| ID | RECEPTION INTERVAL (ms) | MARGIN (ms) | AMOUNT OF CHANGE IN DATA |
|---|---|---|---|
| 0x100 | 100 | 5 | 2 (km/h) |
| 0x200 | 100 | 5 | 5 (m/s$^2$) |
| 0x300 | 100 | 5 | NONE |

FIG. 17

| ID | INTRUSION DETERMINATION RESULTS (NORMAL/ABNORMAL) |
|---|---|
| 0x100 | NORMAL |
| 0x200 | ABNORMAL (INTRUSION DETECTED) |
| 0x300 | NORMAL |

FIG. 18

| | INTRUSION DETERMINATION RESULTS NORMAL | INTRUSION DETERMINATION RESULTS ABNORMAL |
|---|---|---|
| UNAUTHORIZED DETERMINATION RESULTS NORMAL | (NO NEED TO HANDLE) | PROMPT USER TO CONFIRM DIAGNOSIS PORT |
| UNAUTHORIZED DETERMINATION RESULTS ABNORMAL | TRANSMIT DIAGNOSIS MESSAGE TO RELEVANT ECU | 1. PROMPT USER TO CONFIRM DIAGNOSIS PORT<br>2. TRANSMIT ABNORMALITY NOTIFICATION MESSAGE TO ECUS |

FIG. 25

| ID | NEWEST | | | ONE TIME BACK | | | TWO TIMES BACK | | |
|---|---|---|---|---|---|---|---|---|---|
| | TIME | MAC | VALUE | TIME | MAC | VALUE | TIME | MAC | VALUE |
| 0x100 (VEHICLE SPEED) | 210 (ms) | VALID | 18.0 (km/h) | 110 | VALID | 19.2 | 100 | UNAUTHORIZED | 0.0 |
| 0x200 (ACCELERATION) | 220 (ms) | VALID | 0.10 (m/s²) | 120 | VALID | 0.10 | 20 | VALID | 0.20 |
| 0x300 (GEARSHIFT POSITION) | 230 (ms) | VALID | D (DRIVE) | 130 | VALID | D | 30 | VALID | D |

FIG. 26

| ID | 0x100 | 0x200 | 0x300 | DEGREE OF ABNORMALITY | UNAUTHORIZED MAC COUNT |
|---|---|---|---|---|---|
| 0x100 |  | 1: UNAUTHORIZED | 2: UNAUTHORIZED | 2 | 1 |
| 0x200 | 1: UNAUTHORIZED |  | 3: VALID | 1 | 0 |
| 0x300 | 2: UNAUTHORIZED | 3: VALID |  | 1 | 0 |

FIG. 27

| ID | INTRUSION DETERMINATION RESULTS (NORMAL/ABNORMAL) | MAC VALIDITY |
|---|---|---|
| 0x100 | NORMAL | UNAUTHORIZED |
| 0x200 | NORMAL | VALID |
| 0x300 | NORMAL | VALID |

FIG. 28

| | INTRUSION DETERMINATION RESULTS NORMAL | INTRUSION DETERMINATION RESULTS ABNORMAL |
|---|---|---|
| UNAUTHORIZED ACTIVITY DETERMINATION RESULTS NORMAL | [MAC: VALID] NO NEED TO HANDLE | [MAC: VALID] 1. PROMPT USER TO CONFIRM DIAGNOSIS PORT 2. UPDATE KEY |
| | [MAC: UNAUTHORIZED] 1. TRANSMIT DIAGNOSIS MESSAGE TO RELEVANT ECU 2. UPDATE KEY | [MAC: UNAUTHORIZED] PROMPT USER TO CONFIRM DIAGNOSIS PORT |
| UNAUTHORIZED ACTIVITY DETERMINATION RESULTS ABNORMAL | [MAC: VALID] 1. TRANSMIT DIAGNOSIS MESSAGE TO RELEVANT ECU 2. UPDATE KEY | [MAC: VALID] 1. PROMPT USER TO CONFIRM DIAGNOSIS PORT 2. TRANSMIT ABNORMALITY NOTIFICATION MESSAGE TO ECUS 3. UPDATE KEY |
| | [MAC: UNAUTHORIZED] 1. TRANSMIT DIAGNOSIS MESSAGE TO RELEVANT ECU | [MAC: UNAUTHORIZED] 1. PROMPT USER TO CONFIRM DIAGNOSIS PORT 2. TRANSMIT ABNORMALITY NOTIFICATION MESSAGE TO ECUS |

UNAUTHORIZED ACTIVITY DETECTION METHOD, MONITORING ELECTRONIC CONTROL UNIT, AND ONBOARD NETWORK SYSTEM

BACKGROUND

1. Technical Field

The present disclosure relates to technology for detecting transmission of unauthorized frames on an onboard network where electronic control units communicate.

2. Description of the Related Art

In recent years, a great number of devices called electronic control units (ECU) have been placed in systems in automobiles. A network connecting these ECUs is referred to as an onboard network. Many standards exist for onboard networks. One of the most mainstream of these onboard networks is a standard called CAN (Controller Area Network), that is stipulated in ISO11898-1.

A CAN is a bus configured using two wires, and each ECU connected to the buses is called a node. Each node connected to a bus transmits/receives messages called frames. A transmitting node that transmits a frame applies voltage to the two busses, and generates potential difference between the busses, thereby transmitting a value "1" called recessive, and a value "0" called dominant. In a case where multiple transmitting nodes transmit recessive and dominant at exactly the same timing, the dominant is transmitted with priority. In a case where there is an abnormality in the format of a received frame, a receiving node transmits a frame called an error frame. An error frame is a continuous transmission of six bits dominant, thereby notifying the transmitting node and other receiving nodes that there is an abnormality in a frame.

No identifiers indicating the transmission destination or transmission source exist in CAN, with the transmitting node attaching an ID to each frame and transmitting (i.e., sending out signals to the bus), and the receiving nodes only receiving frames of a predetermined ID (i.e., reading signals from the bus). The CSMA/CA (Carrier Sense Multiple Access/Collision Avoidance) format is employed, so when multiple nodes transmit at the same time, arbitration by message ID is performed, with frames having a smaller message ID value being transmitted with higher priority.

There is a threat to onboard CAN network systems in that an attacker might unauthorizedly control an ECU by accessing the bus and transmitting unauthorized frames (frames for attacking), and security measures are being studied.

For example, the onboard network monitoring device described in Japanese Patent No. 5664799 carries out an unauthorized activity detection method where, in a case of the difference between a reception interval measured regarding a frame transmitted over the CAN bus and a communication interval stipulated beforehand exceeds a reference range that has been stipulated, that frame is judged to be unauthorized.

SUMMARY

However, an unauthorized activity detection method such as that in Japanese Patent No. 5664799 cannot detect frames for attack in a case where the attacker takes over by unauthorizedly rewriting firmware of a legitimate ECU and causes that ECU to transmit the frames for attack at a legitimate transmission interval stipulated in the onboard network system. Also, even if the firmware of an ECU is not rewritten, the same situation will occur if malware (an unauthorized program) is executed at the ECU, and frames for attack that the ECU transmits to the CAN bus cannot be detected. International Publication No. 2015/041161 describes technology for detecting unauthorized rewriting of programs or data in ECUs by communicating with the ECUs, but communication with each ECU is necessary in order to constantly confirm unauthorized rewriting of each ECU connected to the bus of the onboard network using this technology, creating an adverse effect of increased amount in bus traffic.

One non-limiting and exemplary embodiment provides an unauthorized activity detection method that can detect that an unauthorized state (abnormality) has occurred by monitoring frames transmitted over the bus, even in a case where an ECU is in an unauthorized state due to firmware being unauthorizedly rewritten, malware being executed, or the like. The present disclosure also discloses an onboard network system that uses the unauthorized activity detection method, and a monitoring electronic control unit (monitoring ECU) that performs unauthorized activity detection in the onboard network system.

In one general aspect, the techniques disclosed here feature an unauthorized activity detection method according to an aspect of the present disclosure is an unauthorized activity detection method for detecting an occurrence of an unauthorized state in an onboard network system having a plurality of electronic control units that perform communication via a bus. The onboard network system includes a monitoring electronic control unit connected to the bus. The unauthorized activity detection method includes first determining, by the monitoring electronic control unit and using unauthorized activity detection rule information indicating a first condition that, whether or not a set of frames received from the bus satisfies the first condition, the first condition being a condition regarding a relations in content between a first frame having a first identifier and a second frame having a second identifier that differs from the first identifier; and detecting, by the monitoring electronic control unit, the occurrence the unauthorized state in a case where the first condition is not satisfied.

According to the present disclosure, in a case where an ECU is in an unauthorized state due to unauthorized rewriting of firmware or by execution of malware, occurrence of the unauthorized state can be detected since the relation between frames transmitted from that ECU and frames that other ECUs transmit is disturbed or the like.

General or specific aspects may be realized by a device, a system, a method, an integrated circuit, a computer program, or a computer-readable recording medium such as a CD-ROM, and may be realized by any combination of a device, system, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of frame reception history that a frame reception history storing unit of the monitoring ECU according to the first embodiment stores;

FIG. 6 is a diagram illustrating an example of unauthorized activity detection rule information that an unauthorized activity detection rule storing unit of the monitoring ECU according to the first embodiment stores;

FIG. 7 is a diagram illustrating an example of unauthorized activity determination results that an unauthorized activity determination results storing unit of the monitoring ECU according to the first embodiment stores;

FIG. 8 is a diagram illustrating an example of an ECU information table that an ECU information table storing unit of the monitoring ECU according to the first embodiment stores;

FIG. 10 is a diagram illustrating an example of a data frame that the ECU according to the first embodiment transmits;

FIG. 15 is a diagram illustrating an example of frame reception history that a frame reception history storing unit of the monitoring ECU according to the second embodiment stores;

FIG. 16 is a diagram illustrating an example of intrusion detection rules that an intrusion detection rule storing unit of the monitoring ECU according to the second embodiment stores;

FIG. 17 is a diagram illustrating an example of intrusion determination results that an intrusion determination results storing unit of the monitoring ECU according to the second embodiment stores;

FIG. 18 is a diagram illustrating an example of an abnormality handling table that an abnormality handling table storing unit of the monitoring ECU according to the second embodiment stores;

FIG. 25 is a diagram illustrating an example of frame reception history that a frame reception history storing unit of the monitoring ECU according to the third embodiment stores;

FIG. 26 is a diagram illustrating an example of unauthorized activity determination results that an unauthorized activity determination results storing unit of the monitoring ECU according to the third embodiment stores;

FIG. 27 is a diagram illustrating an example of intrusion determination results that an intrusion determination results storing unit of the monitoring ECU according to the third embodiment stores;

FIG. 28 is a diagram illustrating an example of an abnormality handling table that an abnormality handling table storing unit of the monitoring ECU according to the third embodiment stores;

DETAILED DESCRIPTION

Figure 1:
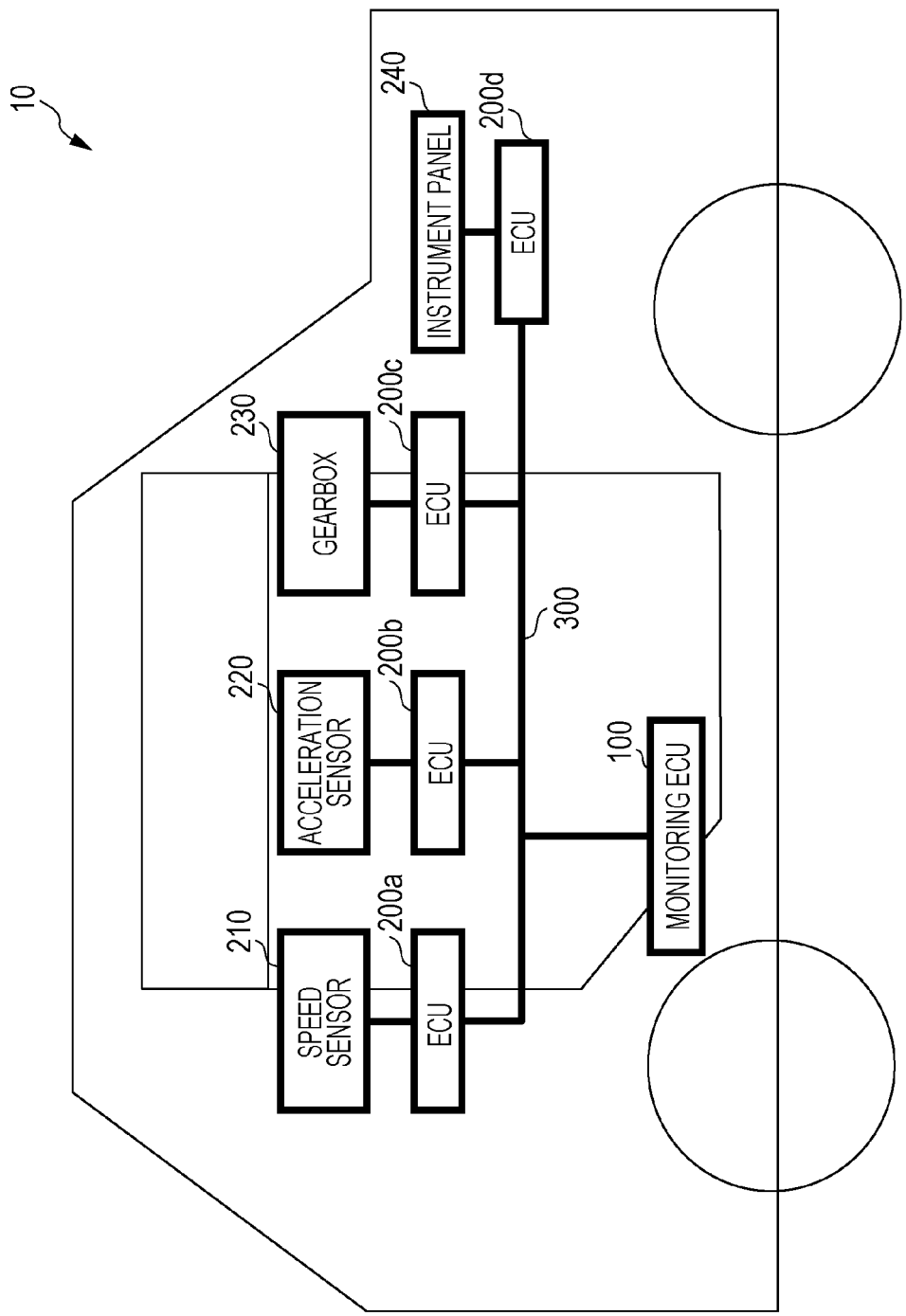
FIG. 1 is a diagram illustrating the overall configuration of an onboard network system according to a first embodiment.

An unauthorized activity detection method according to an aspect of the present disclosure is an unauthorized activity detection method for detecting an occurrence of an unauthorized state in an onboard network system having a plurality of electronic control units that perform communication via a bus. The onboard network system includes a monitoring electronic control unit connected to the bus. The unauthorized activity detection method includes first determining, by the monitoring electronic control unit and using unauthorized activity detection rule information indicating a first condition, whether or not a set of frames received from the bus satisfies the first condition, the first condition being a condition regarding a relation in content between a first frame having a first identifier and a second frame having a second identifier that differs from the first identifier; and detecting, by the monitoring electronic control unit, that the occurrence of the unauthorized state in a case where the first condition is not satisfied. Accordingly, by stipulating the first condition so as to be satisfied in a normal state for example, in a case where the electronic control unit (ECU) is in an unauthorized state due to unauthorized rewriting of firmware or execution of malware, there is a breakdown in relation between frames transmitted by the ECU and frame transmitted by another ECU for example, and the first condition can be made to not be satisfied. Accordingly, occurrence of an unauthorized state can be detected by monitoring the bus.

The unauthorized activity detection method may further include receiving sequentially, by the monitoring electronic control unit, data frames transmitted to the bus. The plurality of electronic control units may exchange the data frames following a Controller Area Network protocol via the bus. The unauthorized activity detection rule information may indicate the first condition in relation of content of data fields between a first type of frame and second type of frame. The first type of frame being a data frame having the first identifier and the second type of frame having the second identifier different from the first identifier. In the first determining, a determination is made regarding whether the first type of frame and the second type of frame satisfy the first condition indicated by the unauthorized activity detection rule information. Accordingly, appropriate detection can be made in a case where an unauthorized state has occurred in an onboard network following CAN in order to exchange frames among ECUs.

The unauthorized activity detection rule information may stipulate, as the first condition, a relation between a value identified based on content of a data field in one or more of the first type of frame, and content of a data field in one or more of the second type of frame. In the first determining, a predetermined computation may be executed to distinguish whether or not the first condition is satisfied. The first determining is performed using a first value based on content of the data field in the first type of frame received during one or a plurality of units of time, and a second value based on content of the data field in the second type of frame received during, out of the one or the plurality of units of time, a last unit of time. Accordingly, occurrence of an unauthorized state can be detected in a case where a relation between same-time content between series of two types of data frames having IDs (identifiers) different from each other being in a state that is distinguishable from a normal state.

The unauthorized activity detection rule information may stipulate, as the first condition, a relation between a value identified based on content of data fields in a plurality of first type of frames, and content of data fields in one or more of the second type of frames. In the first determining, a predetermined computation is executed to distinguish whether or not the first condition is satisfied. The first determining is performed using a first value based on content of the data field in the first type of frame received during a plurality of units of time, and a second value based on content of the data field in the second type of frame that has been received during, out of the plurality of units of time, a last unit of time. Accordingly, occurrence of an unauthorized state can be detected in a case where a relation between a first value, calculated by computation such as difference (amount of change), total (amount of accumulation), or the like, of the contents of multiple data frames in one series of data frames out of two types (two series) of data frames having IDs (identifiers) different from each other, and a second value based on the contents of one or multiple data frames in the other series, is in a state that is distinguishable from a normal state.

The predetermined computation may be processing to distinguish whether or not the first condition is satisfied, according to whether or not the first value falls within a range of quantitative variable values calculated using the second value as a qualitative variable value, based on a standard where a range of values of a quantitative variable is stipulated for each qualitative variable value. Accordingly, in a case where, one content out of content of two types of data frames having IDs different from each other sections the state of the vehicle (state of gearshift position, etc.) for example, occurrence of an unauthorized state can be detected by whether or not the other content is contained within a certain range decided by the state of the vehicle.

The predetermined computation may be processing to distinguish whether or not the first condition is satisfied, according to whether or not the second value falls within a range of objective variable values calculated using the first value as an explanatory variable value, based on a relational expression indicating a relation between an objective variable and the explanatory variable. Accordingly, in a case where, of contents of two types of data frames having IDs different from each other, one content and the other content have a certain causal association in a normal state for example, setting that relation as a condition can enable detection of occurrence of an unauthorized state.

The unauthorized activity detection rule information may stipulate, as the first condition, a relation between content of a data field in one or more of the first type of frames and content of a data field in one or more of the second type of frames, by a relational expression using a Pearson's product-moment correlation coefficient, a maximum information coefficient, or a canonical correlation coefficient. Accordingly, detection of occurrence of an unauthorized state can be enabled by a condition stipulating contents of two types of data frames having IDs different from each other by a relational expression.

The unauthorized activity detection method further include calculating, by the monitoring electronic control unit, a degree of abnormality relating to a transmission of the first type of frame, in accordance with a count of conditions determined as not being satisfied in the first determining, the count of conditions being out of the first condition and a second condition further indicated by the unauthorized activity detection rule information to be a condition regarding relation of content of data frames between the first type of frame, and a third type of frame that is a data frame having a third identifier that is different from the first identifier and the second identifier, and transmitting, by the monitoring electronic control unit, a predetermined frame to be receivable by an electronic control unit transmitting the first type of frame, in a case where the degree of abnormality calculated in the calculating satisfies a predetermined abnormality condition. In the first determining, determination is further made regarding whether or not the first type of frame and the third type of frame received satisfy the second condition indicated by the unauthorized activity detection rule information. Accordingly, the degree of abnormality is calculated with the level of relation to occurrence of an unauthorized state (abnormality) reflected, so the source of occurrence of the unauthorized state can be identified in accordance with the degree of abnormality. Also, in a case of using certain frames for diagnosis of individual ECUs for example, the ECU of which the state should be diagnosed can be narrowed down in accordance with the degree of abnormality and transmission performed, so increase in bus traffic due to communication for ECU diagnosis can be suppressed.

The unauthorized activity detection method may further include second determining, by the monitoring electronic control unit using intrusion detection rule information indicating a second condition regarding a data frame set for each identifier of data frames, of whether or not a data frame received from the bus in the receiving satisfies the second condition indicated by the intrusion detection rule information; deciding, by the monitoring electronic control unit, content of a handling processing in accordance with a combination of determination results in the first determining and determination results in the second determining; and executing, by the monitoring electronic control unit, the handling processing in accordance with the deciding. The second condition regarding a data frame of a target identifier, that the intrusion detection rule information indicates, includes a condition regarding one of a reception interval between data frames having the target identifier, a count of data frames having the target identifier are received in a certain time, and an amount of change indicating a difference in values extracted from data fields among data frames having the target identifier. Accordingly, transmission of an unauthorized data frame from outside can be detected by intrusion determination based on intrusion detection rule information. Also, the content of the attack by an attacker and so forth can be classified by a combination of at least unauthorized activity determination based on unauthorized activity detection rule information and intrusion determination based on intrusion detection rule information, so handling processing that is appropriate for the attack can be decided (selected) and handling carried out.

The unauthorized activity detection method may further include verifying, by the monitoring electronic control unit, validity of an authenticator for authentication in a data frame received from the bus. In the deciding, a key updating processing, relating to updating of a key for authentication, may be decided as the content of the handling processing under a third condition, the third condition being predetermined. Accordingly, the content or effect of the attack by an attacker and so forth can be classified by a combination of unauthorized activity determination based on unauthorized activity detection rule information, intrusion determination based on intrusion detection rule information, and verification results of the authenticator, so handling processing that is appropriate for the attack, such as updating keys relating to authentication as necessary, or the like, can be decided (selected) and handling carried out.

The unauthorized activity detection method may further include executing, in the handling processing, the first determining, the second determining, and the verifying, for a data frame received in the receiving after having executed the key updating processing, and executing, by the monitoring electronic control unit, in a case where a combination of the determination results in the first determining, the determination results in the second determining, and the verification results in the verifying satisfy a fourth condition, another handling processing that is different from the key updating processing. Accordingly, appropriate handling can be performed other handling processing in a case where a situation is not improved by key updating processing, by stipulating the predetermined condition such that cases where a situation is not improved by key updating processing can be detected.

The unauthorized activity detection method may further include identifying, in a case where an occurrence of the unauthorized state has been detected, one of a sub-network that has transmitted a frame related to the occurrence of the unauthorized state, an electronic control unit that has transmitted the frame related to the occurrence of the unauthorized state, and an identifier of the frame related to the occurrence of the unauthorized state. Accordingly, identifying information relating to occurring of the unauthorized state enables content of the attack by an attacker to be classified in more detail, so the attack can be handled more appropriately.

The unauthorized activity detection method may further include executing, by the monitoring electronic control unit, a handling processing in a case of detecting an occurrence of the unauthorized state. The handling processing may include one of transmitting a diagnosis frame to be receivable by a particular electronic control unit connected to the bus, confirming validity of the particular electronic control unit connected to the bus by performing a challenge-response authentication, providing notification to prompt confirmation of a diagnosis port on the bus, providing notification to prompt a driver of a vehicle, in which the onboard network system is installed, to stop or to drive slowly, providing notification to prompt the driver of the vehicle, in which the onboard network system is installed, to go to a dealer, providing notification to the driver of the vehicle, in which the onboard network system is installed, that the unauthorized state is occurring, providing notification to the electronic control unit connected to the bus that a data frame having a particular identifier is unauthorized, transmitting notification to a server outside of the vehicle, in which the onboard network system is installed, that an unauthorized data frame is being transmitted, providing notification to the vehicle or roadside device near the vehicle, in which the onboard network system is installed, that the unauthorized state is occurring, switching the onboard network system to a fail-safe mode that has been set beforehand, and recording as a log that the unauthorized state is occurring. Accordingly, the attack can be handled more appropriately.

The unauthorized activity detection method may further include identifying, by the monitoring electronic control unit, a relation of content of frames between frames having identifiers different from each other by multivariate analysis based on a set of frames received from the bus, and generating or updating, by the monitoring electronic control unit, the unauthorized activity detection rule information, to indicate a condition representing the identified relation. Accordingly, this enables unauthorized activity detection rule information to be appropriately generated, so that occurrence of an unauthorized state can be appropriately detected.

A monitoring electronic control unit according to an aspect of the present disclosure is a monitoring electronic control unit connected to a bus in an onboard network system having a plurality of electronic control units that perform communication via the bus. The monitoring electronic control unit includes a storage that stores unauthorized activity detection rule information indicating a condition regarding a relation in content between a first frame having a first identifier and a second frame having a second identifier that differs from the first identifier. The monitoring electronic control unit includes a receiver that sequentially receives frames from the bus. The monitoring electronic control unit includes circuitry that, in operation, performs operations including determining whether or not the frames received from the bus by the receiver satisfies the condition indicated by the unauthorized activity detection rule information. Accordingly, in a case where the electronic control unit (ECU) is in an unauthorized state due to unauthorized rewriting of firmware or execution of malware, there is a breakdown in relation between frames transmitted by the ECU and frames having another identifier, so occurrence of an unauthorized state can be detected.

An onboard network system according to an aspect of the present disclosure is an onboard network system having a plurality of electronic control units that perform communication via a bus. The onboard network system includes a storage that stores unauthorized activity detection rule information indicating a condition regarding a relation in content between a first frame having a first identifier and a second frame having a second identifier that differs from the first identifier. The onboard network system includes circuitry that, in operation, performs operations including determining whether or not a set of frames received from the bus satisfies the condition indicated by the unauthorized activity detection rule information, to determine whether or not an unauthorized state has occurred Accordingly, detection can be made that the electronic control unit (ECU) is in an unauthorized state due to unauthorized rewriting of firmware or execution of malware, from the determination results of the unauthorized activity determination unit.

It should be noted that these general or specific embodiments may be implemented as a system, a method, an integrated circuit, a computer program, a storage medium, or a computer-readable recording medium such as a CD-ROM, and may be realized by any combination of a system, method, integrated circuit, computer program, and recording medium.

The following is a detailed description of an onboard network system according to embodiments with reference to the drawings. Note that the embodiments described below are all specific examples of the present disclosure. Accordingly, values, components, placements and connected states of components, steps (processes) and the order of steps, and so forth illustrated in the following embodiments, are only exemplary, and do not restrict the present disclosure. Components in the following embodiments which are not included in an independent Claim are optionally addable components. The drawings are schematic diagrams, and are not necessarily created in an exact manner.

First Embodiment

An unauthorized activity detection method used in an onboard network system 10 where multiple electronic control units (ECUs) communicate via a bus will be described as an embodiment of the present disclosure, with reference to the diagrams. The unauthorized activity detection method is a method for detecting transmission of an unauthorized frame onto the bus from an unauthorized node (e.g., an ECU taken over by an attacker or the like), and is primarily executed by a monitoring ECU connected to the bus. The monitoring ECU in the onboard network system detects occurrence of an unauthorized state (that an unauthorized data frame has been transmitted) based on a relation of content between data frames (messages) having two identifiers (message IDs) that are different from each other.

1.1 Overall Configuration of Onboard Network System 10

FIG. 1 is a diagram illustrating the overall configuration of the onboard network system 10. The onboard network system 10 is an example of a network communication system that communicates according to the CAN protocol, and is a network communication system onboard an automobile in which various types of devices have been installed, such as a control device, sensor, actuator, user interface device, and so forth. The onboard network system 10 has multiple devices that perform communication relating to frames via the CAN bus making up the onboard network, using the unauthorized activity detection method. Specifically, the onboard network system 10 includes a bus 300, a monitoring ECU 100, and nodes which are ECUs such as an ECU 200a, an ECU 200b, an ECU 200c, an ECU 200d, and so forth, connected to various types of devices and to the bus 300, as illustrated in FIG. 1. Note that many other ECUs besides the monitoring ECU 100 and ECUs 200a, 200b, 200c, and 200d are included in the onboard network system 10, but description will be made here focusing on the monitoring ECU 100 and ECUs 200a, 200b, 200c, and 200d, for sake of convenience. An ECU is a device that includes, for example, digital circuits such as a processor (microprocessor), memory, and so forth, analog circuits, communication circuits, and so forth. The memory is read-only memory (ROM), random access memory (RAM), and so forth, capable of storing a control program (computer program) to be executed by the processor. Functions of the components of the ECU are realized by the processor operating following the control program (computer program), for example. A computer program is configured as a combination of multiple command codes representing instructions to the processor, to achieve predetermined functions.

The ECU 200a, ECU 200b, ECU 200c, and ECU 200d are connected to the bus 300, and respectively connected to a speed sensor 210, an acceleration sensor 220, a transmission 230, and an instrument panel 240. The ECU 200a periodically obtains speed of the vehicle from the speed sensor 210, and periodically transmits data frames notifying the obtained speed to the bus 300. The ECU 200b periodically obtains acceleration of the vehicle from the acceleration sensor 220, and periodically transmits data frames notifying the obtained acceleration to the bus 300. The ECU 200c periodically obtains the state of the transmission 230 and periodically transmits data frames notifying the state of the transmission 230 to the bus 300. The ECU 200d receives the data frames notifying the speed of the vehicle and the state of the gearshift position, and updates information displayed on the instrument panel 240.

The monitoring ECU 100 is a type of ECU connected to the bus 300, which has a function of monitoring data frames flowing over the bus (i.e., data frames appearing on the bus), and performs unauthorized activity detection processing for detection of whether or not unauthorized data frames have been transmitted (unauthorized activity detection). The ECUs on the onboard network system 10 exchange frames following the CAN protocol. Frames in the CAN protocol include data frames, remote frames, overload frames, and error frames. Description will be made primarily here regarding data frames.

1.2 Data Frame Format

Figure 2:
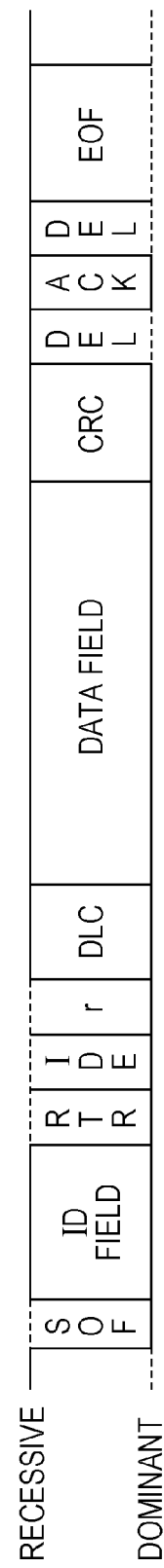
FIG. 2 is a diagram illustrating a format of a data frame stipulated in the CAN protocol.

The following is a description of a data frame which is a type of frame used on a network according to the CAN protocol. FIG. 2 is a diagram illustrating a format of a data frame stipulated by the CAN protocol. The diagram illustrates a data frame according to a standard ID format stipulated in the CAN protocol. A data frame is configured including the fields of a SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of 1-bit dominant. The state of the bus is recessive when idle, and start of transmission of a frame is notified by being changed to dominant by the SOF.

The ID field is made up of 11 bits, and is a field storing an ID (message ID) which is a value indicating the type of data. Design has been implemented so that in a case where multiple nodes start transmission at the same time, frames with smaller ID values are given higher priority, in order to perform communication arbitration using this ID field.

The RTR is a value identifying a data frame and remote frame, and is made up of 1-bit dominant in a data frame. The IDE and "r" are each made up of 1-bit dominant. The DLC is made up of four bits, and is a value indicating the length of the data field.

The data field is a maximum of 64 bits, and is a value indicating the content of the data being transmitted. The length can be adjusted in 8-bit increments. The CAN protocol does not stipulate the specification of data being transmitted; that is set at the onboard network system 10. Accordingly, the specification is dependent on the model, manufacturer (manufacturing maker), or the like.

The CRC sequence ("CRC" illustrated in FIG. 2) is made up of 15 bits. This is calculated from the transmitted values of the SOF, ID field, control field, and data field.

The CRC delimiter is made up of 1-bit recessive, and is a sectioning symbol representing the end of the CRC sequence. The CRC sequence and CRC delimiter are collectively referred to as the CRC field.

The ACK slot (the "ACK" in FIG. 2) is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominance after transmission, so the transmitting node will be able to confirm that one of the receiving nodes has succeeded in reception of the ACK slot if dominant after transmission.

The ACK delimiter is made up of 1-bit recessive, and is a sectioning symbol representing the end of the ACK. The EOF is made up of 7-bits recessive, and represents the end of the data frame.

1.3 Error Frame Format

Figure 3:
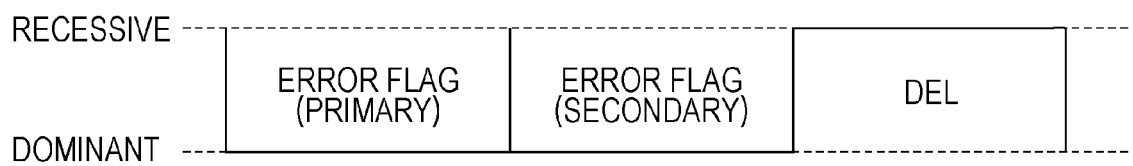
FIG. 3 is a diagram illustrating a format of an error frame stipulated in the CAN protocol.

FIG. 3 is a diagram illustrating the format of the error frame stipulated in the CAN protocol. An error frame is made up of an error flag (primary), error flag (secondary), and an error delimiter.

The error flag (primary) is used to notify occurrence of an error to other nodes. A node which has detected an error transmits six consecutive bits dominant to notify other nodes of the occurrence of the error. This transmission violates the bit stuffing rule in the CAN protocol (that six bits or more of the same value are not to be consecutively transmitted), and causes other nodes to transmit an error frame (secondary).

The error flag (secondary) is made up of six consecutive bits dominant, used to notify occurrence of an error to the other nodes. All nodes that have received the error flag (primary) and detected the violation of the bit stuffing rule will transmit the error flag (secondary).

The error delimiter "DEL" is an 8-bit consecutive recessive, and indicates the end of the error frame.

1.4 Configuration of Monitoring ECU 100

Figure 4:
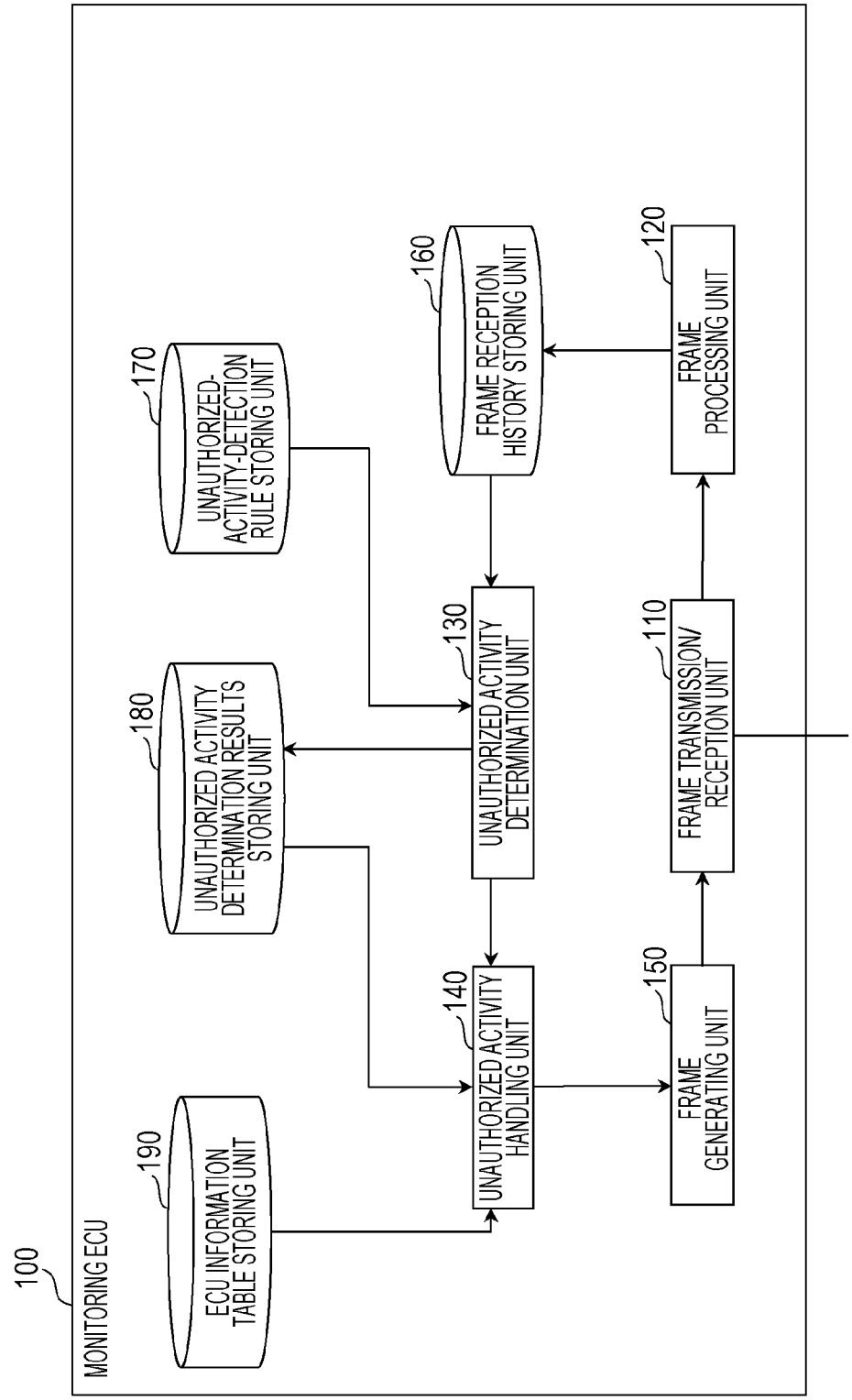
FIG. 4 is a configuration diagram of a monitoring ECU according to the first embodiment.

FIG. 4 is a configuration diagram of the monitoring ECU 100. The monitoring ECU 100 is configured including a frame transmission/reception unit 110, a frame processing unit 120, an unauthorized activity determination unit 130, an unauthorized activity handling unit 140, a frame generating unit 150, a frame reception history storing unit 160, an unauthorized-activity-detection rule storing unit 170, an unauthorized activity determination results storing unit 180, and an ECU information table storing unit 190. The components of the monitoring ECU 100 illustrated in FIG. 4 can be realized by a storage medium such as memory or the like of the monitoring ECU 100, a communication circuit, and a processor or the like that executes programs stored in memory.

The frame transmission/reception unit 110 transmits/receives frames (data frames and so forth) following the CAN protocol to and from the bus 300. The frame transmission/reception unit 110 has a function of serving as a receiving unit that receives frames from the bus 300, one bit at a time. Upon having received a data frame without error, the frame transmission/reception unit 110 transmits information such as the ID, DLC, data, and so forth, within the data frame, to the frame processing unit 120. In a case of having judged that a data frame does not conform to the CAN protocol, the frame transmission/reception unit 110 transmits an error frame. Also, in a case of having received an error frame while receiving data frames, i.e., in a case of interpreting that a received data frame is an error frame from values thereof, the frame transmission/reception unit 110 discards the rest of that data frame. In a case of having received a transmission request for a data frame from the frame generating unit 150, the frame transmission/reception unit 110 transmits the content of that data frame to the bus 300 one bit at a time. Processing filling the CAN protocol such as communication arbitration is also realized at the frame transmission/reception unit 110.

The frame processing unit 120 receives information of data frames from the frame transmission/reception unit 110, and interprets the contents of the data frames. The frame processing unit 120 obtains information regarding vehicle speed, acceleration, and state of gearshift position and so forth indicated by the data frames transmitted from each of the ECU 200a, 220b, and 200c, and updates information relating to the data frames (frame reception history) stored in the frame reception history storing unit 160, based on the obtained information.

The unauthorized activity determination unit 130 periodically determines, using a predetermined unit of time (e.g., 100 ms) as a cycle, whether or not an unauthorized data frame has been received (unauthorized activity determination retarding to whether or not an unauthorized data frame has been transmitted), based on unauthorized activity detection rule information stored in the unauthorized-activity-detection rule storing unit 170 and frame reception history stored in the frame reception history storing unit 160. The unauthorized activity determination unit 130 performs unauthorized activity determination processing by whether or not conditions are satisfied regarding each condition relating to relation among frames having multiple different IDs, indicated by unauthorized activity detection rule information, and determines that there is unauthorized activity in a case where the conditions are not satisfied, for example. The unauthorized activity determining unit 130 updates the unauthorized activity determination results that the unauthorized activity determination results storing unit 180 stores. Note that the unauthorized activity determination unit 130 calculates a degree of abnormality in accordance with a count of detected unauthorized activity (e.g., the number of conditions not satisfied) based on the conditions indicated in the unauthorized activity determination rule information for frames of an DI, regarding each ID of the frames. The degree of abnormality is then added to unauthorized activity determination results stored by the unauthorized activity determination results storing unit 180. If the count of detected unauthorized activity is 0, the degree of abnormality is 0. A degree of abnormality of 0 means that no abnormality has been detected. In a case where unauthorized activity has been detected as a result of the unauthorized activity determination (i.e., in a case where occurrence of a state of unauthorized activity has been detected), the unauthorized activity determination unit 130 notifies the unauthorized activity handling unit 140 that unauthorized activity has been detected.

Upon being notified from the unauthorized activity determination unit 130 that unauthorized activity has been detected, the unauthorized activity handling unit 140 references the unauthorized activity determination results stored in the unauthorized activity determination results storing unit 180 and the ECU information table stored in the ECU information table storing unit 190, to decide the contents of handling processing to handle the unauthorized activity. In a case of having decided on the handling processing, the unauthorized activity handling unit 140 effects control to execute that handling processing. For example, in a case where unauthorized activity has been detected relating to a data frame having a particular ID from the unauthorized activity determination results (as one example, in a case where unauthorized activity has been detected and the calculated degree of abnormality is the highest), the unauthorized activity handling unit 140 references the ECU information table and requests the frame generating unit 150 to generate a diagnosis regarding the ECU that has transmitted this data frame.

In a case of having been requested to generate a data frame to be transmitted, the frame generating unit 150 generates the data frame, and causes the frame transmission/reception unit 110 to transmit the data frame. For example, in a case where generating of a diagnosis message has been requested, the frame generating unit 150 generates a data frame representing a diagnosis message that has been set beforehand, and transmits that data frame to the monitoring ECU 100 via the frame transmission/reception unit 110.

The frame reception history storing unit 160 stores frame reception history (see FIG. 5), which is information relating to data frames that the monitoring ECU 100 has successively received.

The unauthorized-activity-detection rule storing unit 170 stores unauthorized activity detection rule information (see FIG. 6) that the unauthorized activity determination unit 130 reference for unauthorized activity determination.

The unauthorized activity determination results storing unit 180 stores the unauthorized activity determination results (see FIG. 7), which are the results of the unauthorized activity determination unit 130 having determined whether or not the rules (conditions) indicated by the unauthorized activity detection rule information have been matched.

The ECU information table storing unit 190 stores the ECU information table (see FIG. 8) compiled correlating each ID with information relating to the ECU that transmits data frames of that ID.

1.5 Frame Reception History

FIG. 5 illustrates an example of frame reception history that the frame reception history storing unit 160 stores. The frame reception history is information relating to the contents of data frames that the monitoring ECU 100 has received from the past until the present. In the example in in FIG. 5, particular values (values indicating each of the vehicle speed, acceleration and state of gearshift position) that the contents of data frames received regarding three IDs, received each unit time (e.g., 100 ms) from the present (newest) up to three times back, indicate. This example indicates that, of data frames having the ID 0x100 relating to vehicle speed, the value of the vehicle speed indicated by the latest-received data frame is 18.0 km/h, the value of the vehicle speed indicated by the data frame received one time back is 19.2 km/h, the value of the vehicle speed indicated by the data frame received two times back is 19.6 km/h, and the value of the vehicle speed indicated by the data frame received three times back is 20.0 km/h. This example also indicates that of data frames having the ID 0x200 relating to acceleration, the acceleration values indicated by the data frames received from the present up to three times back are 0.1 m/s², 0.10 m/s², 0.20 m/s², and 0.20 m/s², respectively. This example also indicates that of data frames having the ID 0x300 relating to the state of gearshift position, gearshift position state values indicated by the data frames received from the present up to three times back all indicate a "D" (drive) state.

This frame reception history is used for the unauthorized activity determination unit 130 to confirm the contents between data frames having different IDs from each other (determining whether or not the conditions indicated by the unauthorized activity detection rule information are satisfied). Although values for the contents of data frames are only shown from those received from the newest up to three times back in FIG. 5, the frame reception history can be configured to include information necessary for the unauthorized activity determination unit 130 to perform unauthorized activity determination using the unauthorized activity detection rule information. For example, the frame reception history may be information indicating the contents of all data frames that the monitoring ECU 100 has received ever since the vehicle started traveling (e.g., from the time that the engine was started). Note that the frame reception history storing unit 160 may have one region to store the integrated value of acceleration, for example.

1.6 Unauthorized Activity Detection Rule Information

FIG. 6 illustrates an example of unauthorized activity detection rule information that the unauthorized-activity-detection rule storing unit 170 stores. The unauthorized activity detection rule information includes one or more (three in the example in FIG. 6) conditions (rules) relating to the relation between contents of data frames having IDs that are different from each other.

In the example in FIG. 6, the unauthorized activity detection rule information includes, as the rule for rule No. 1, conditions regarding the relation between the content of data frames of which the ID is 0x100 (vehicle speed) and the content of data frames of which the ID is 0x200 (acceleration). The condition is that the value of vehicle speed (speed) indicated by a data frame of which the ID is 0x100 that has been received in a certain unit time (e.g., 100 ms) is within a range of ±1 km/h of an integrated value of acceleration, obtained by accumulating acceleration values indicated by data frames of which the ID is 0x200 received in past unit times further in the past from that unit time (e.g., each unit time after the vehicle started traveling). If this condition is satisfied, that means that the state is a normal state where an appropriate relation is maintained, while if this condition is not satisfied, the unauthorized activity determination unit 130 determines this to be unauthorized (i.e., an unauthorized state is occurring). Note that the integrated value of acceleration can be calculated by the following expression, including conversion of units, for example.

Integrated value=(Σ(acceleration indicated by received data frames with ID 0x200×3.6)/(1/transmission cycle of data frames with ID 0x200)

Also in the example in FIG. 6, the unauthorized activity detection rule information includes, as the rule for rule No. 2, a condition regarding the relation between the content of data frames of which the ID is 0x100 (vehicle speed) and the content of data frames of which the ID is 0x300 (state of gearshift position). The condition is that in a case where the value of the state of gearshift position indicated by a data frame of which the ID is 0x300 that has been received in a certain unit time indicates "D" (drive), the amount of change from the vehicle speed indicated by the data frame received in the previous unit time as to the vehicle speed indicated by the data frame of which the ID is 0x100 that has been received in the same unit time (e.g., difference) is suppressed to within 1.0 km/h, and in a case that "R" (reverse) is indicated instead of "D", the amount of change in vehicle speed is suppressed to within 0.5 km/h. If this condition is not satisfied, the unauthorized activity determination unit 130 determines this to be unauthorized.

Also in the example in FIG. 6, the unauthorized activity detection rule information includes, as the rule for rule No. 3, a condition regarding the relation between the content of data frames of which the ID is 0x200 (acceleration) and the content of data frames of which the ID is 0x300 (state of gearshift position). The condition is that in a case where the value of the state of gearshift position indicated by a data frame of which the ID is 0x300 that has been received in a certain unit time indicates "D" (drive), the amount of change from the acceleration indicated by the data frame received in the previous unit time as to the acceleration indicated by the data frame of which the ID is 0x200 that has been received in the same unit time (e.g., difference) is suppressed to within 1.0 m/s², and in a case that "R" (reverse) is indicated instead of "D", the amount of change in acceleration is suppressed to within 0.5 m/s². If this condition is not satisfied, the unauthorized activity determination unit 130 determines this to be unauthorized.

1.7 Unauthorized Activity Determination Results

FIG. 7 illustrates an example of unauthorized activity determination results stored in the unauthorized activity determination results storing unit 180. The example in FIG. 7 illustrates, with regard to each data frame ID (at the left end in FIG. 7), whether or not the unauthorized activity determination unit 130 has determined to be unauthorized based on the conditions relating to the relation between a data frame of that ID and a data frame of another ID (whether determined to be valid). In addition to whether determined to be unauthorized or not, FIG. 7 further notes the rule No. regarding the rules (conditions) in the unauthorized activity detection rule information used for the determination. In this example, the conditions of rule No. 1 and the conditions of rule No. 2 are determined by the unauthorized activity determination unit 130 not to have been satisfied (i.e., determined to be unauthorized), while the conditions of rule No. 3 are determined to have been satisfied (i.e., determined to be valid).

Also added to the unauthorized activity determination results by the unauthorized activity determination unit 130 is the degree of abnormality calculated in accordance with the count of determination (detection) of unauthorized activity regarding the frames of each ID. As illustrated in FIG. 7, the data frame of which the ID is 0x100 has been determined to be unauthorized under the condition of rule No. 1 and further has been determined to be unauthorized under the condition of rule No. 2, so the degree of abnormality is calculated to be 2. The data frame of which the ID is 0x200 has been determined to be unauthorized under the condition of rule No. 1, but has not been determined to be unauthorized under the condition of rule No. 3, so the degree of abnormality is calculated to be 1. The data frame of which the ID is 0x300 has been determined to be unauthorized under the condition of rule No. 2, but has not been determined to be unauthorized under the condition of rule No. 3, so the degree of abnormality is calculated to be 1.

1.8 ECU Information Table

FIG. 8 illustrates an example of an ECU information table that the ECU information table storing unit 190 stores. The ECU information table is a table where each data frame ID is correlated with information regarding the ECU that is the transmission source of the data frame of that ID (transmission ECU information), as illustrated in FIG. 8. The example in FIG. 8 illustrates that data frames of ID 0x100 are transmitted from the ECU 200a, data frames of ID 0x200 are transmitted from the ECU 200b, and data frames of ID 0x300 are transmitted from the ECU 200c. The transmission ECU information regarding an ECU that the ECU information table indicates may include, regarding that ECU, information and so forth necessary to identify the content of a diagnosis message that is a data frame transmitted to diagnose the state of that ECU for example, although omitted from illustration in FIG. 8. A diagnosis message transmitted to diagnose the state of a certain ECU includes, for example, identification information for identifying that ECU, information necessary for diagnosis of that ECU, and so forth. Diagnosis of an ECU started by the monitoring ECU 100 transmitting a diagnosis message is, for example, diagnosis regarding whether or not the firmware of the ECU has been unauthorizedly rewritten, and is carried out following a method that has been set beforehand. The ECU is configured to performs processing that has been set beforehand in response to this diagnosis, such as transmitting information for diagnosis (e.g., a hash value for memory contents) to the monitoring ECU 100, for example.

1.9 Configuration of ECU 200a

Figure 9:
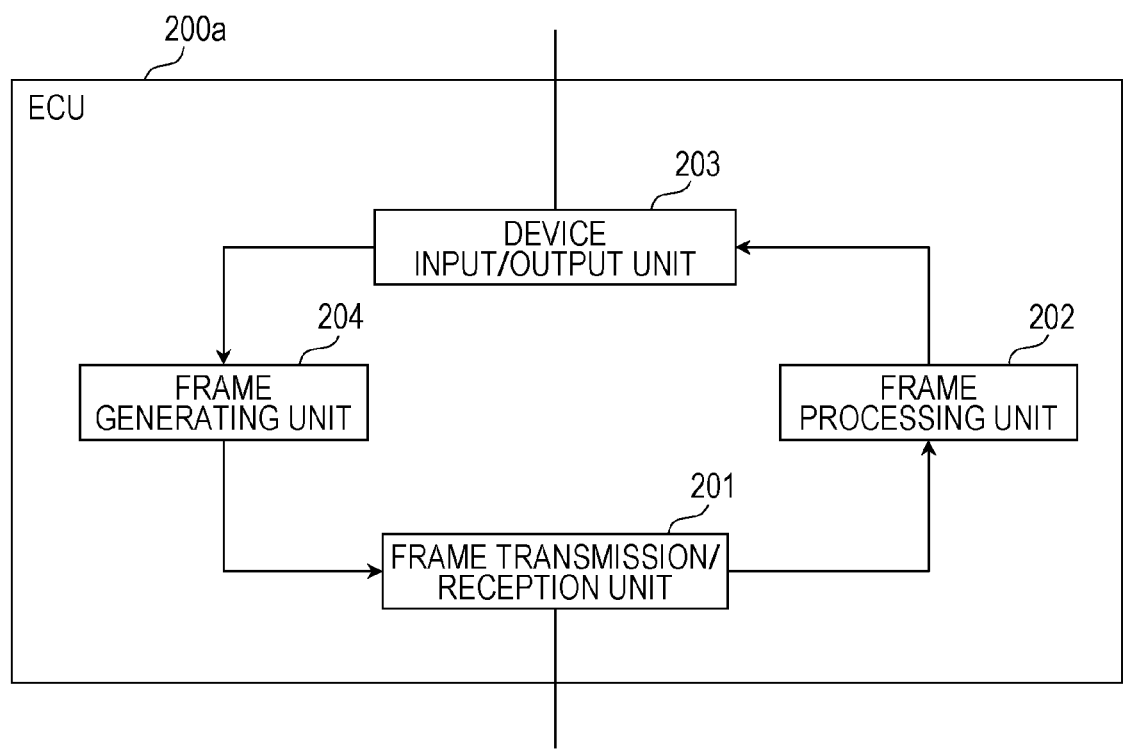
FIG. 9 is a configuration diagram of an ECU according to the first embodiment.

FIG. 9 is a configuration diagram of the ECU 200a. The ECU 200a is configured including a frame transmission/reception unit 201, a frame processing unit 202, a device input/output unit 203, and a frame generating unit 204. These components are functional components, the functions thereof being realized by a communication circuit, processor, digital circuit, or the like, in the ECU 200a, executing control programs stored in memory. Note that the ECU 200b, ECU 200c, and ECU 200d have generally the same configuration as the ECU 200a.

The frame transmission/reception unit 201 transmits and receives frames following the CAN protocol (data frames, etc.) to and from the bus 300. The frame transmission/reception unit 201 receives data frames from the bus 300 one bit at a time, an upon completing reception of a data frame without error, transfers information within the data frame, such as ID, DLC, and data, to the frame processing unit 202. In a case of having determined that a data frame does not conform to the CAN protocol, the frame transmission/reception unit 201 transmits an error frame. In a case of having received an error frame while receiving a data frame, the frame transmission/reception unit 201 discards the rest of the data frame. The frame transmission/reception unit 201 also transmits to the bus 300 the contents of a frame regarding which notification has been received from the frame generating unit 204. Processing conforming to the CAN protocol, such as communication arbitration, is also realized at the frame transmission/reception unit 201.

The frame processing unit 202 interprets the contents of received data frames. This will be described using the ECU 200d that has the same configuration as the ECU 200a as an example. The frame processing unit 202 of the ECU 200d analyzes the vehicle speed (information of the speed sensor 210) and gearshift position state (information of the state of the transmission 230), included in data frames transmitted from the ECU 200a and ECU 200c respectively, and notifies the device input/output unit 203 of the ECU 200d of information necessary to update the display on the instrument panel 240, and so forth. In a case of having received a data frame that is a diagnosis message from the monitoring ECU 100, for example, the frame processing unit 202 also may transmit diagnosis information to the bus 300 via the frame transmission/reception unit 201 so that the monitoring ECU 100 will be able to receive diagnosis information, by performing predetermined processing.

In the ECU 200a, ECU 200b, or ECU 200c, the device input/output unit 203 communicates with devices connected to that ECU. For example, in the ECU 200a connected to the speed sensor 210, the device input/output unit 203 obtains the current vehicle speed from the speed sensor 210 and notifies it to the frame generating unit 204. In the ECU 200b connected to the acceleration sensor 220, the device input/output unit 203 obtains the current acceleration of the vehicle from the acceleration sensor 220 and notifies it to the frame generating unit 204. In the ECU 200c connected to the transmission 230, the device input/output unit 203 obtains the current shift position of the transmission, and notifies this to the frame generating unit 204. In the ECU 200d connected to the instrument panel 240, the device input/output unit 203 updates the display on the instrument panel 240 and so forth, by sending control information to the instrument panel 240 based on values notified from the frame processing unit 202.

The frame generating unit 204 generates data frames to be transmitted to the bus 300 based on information notified from the device input/output unit 203, and transmits the generated data frames to the bus via the frame transmission/reception unit 201. For example, at the ECU 200a, the frame generating unit 204 generates data frames containing information of the vehicle speed from the speed sensor 210 that has been notified from the device input/output unit 203 at a predetermined cycle (e.g., at 100 ms intervals), and makes notification to the frame transmission/reception unit 201. Examples of data frames that the ECU 200a, ECU 200b, and ECU 200c respectively transmit will be described with reference to FIG. 10 next.

1.10 Data Frames Transmitted by ECUs

FIG. 10 illustrates examples of data frames transmitted by each of the ECU 200a, ECU 200b, and ECU 200c. A data frame 401 transmitted by the ECU 200a has the ID 0x100. The DLC is 2, and the data field thereof represents the vehicle speed (in increments of 0.1 km/h) by two bytes of the first byte and the second byte combined. FIG. 10 illustrates an example of vehicle speed that is 20.0 km/h (0xC8).

A data frame 402 transmitted by the ECU 200b has the ID 0x200. The DLC is 2, and the data field thereof represents the vehicle speed (in increments of 0.01 m/s$^2$) by two bytes of the first byte and the second byte combined. FIG. 10 illustrates an example of acceleration that is 0.10 m/s$^2$.

A data frame 403 transmitted by the ECU 200c has the ID 0x300. The DLC is 1, and the data field thereof represents the state of the transmission 230. This value is 0 when the state of the transmission 230 is "N" (neutral), 1 in the state of "R" (reverse), and 2 in the state of "D" (drive). FIG. 10 illustrates an example representing that the state of the transmission 230 is "D".

1.11 Operations of Monitoring ECU 100

Figure 11:
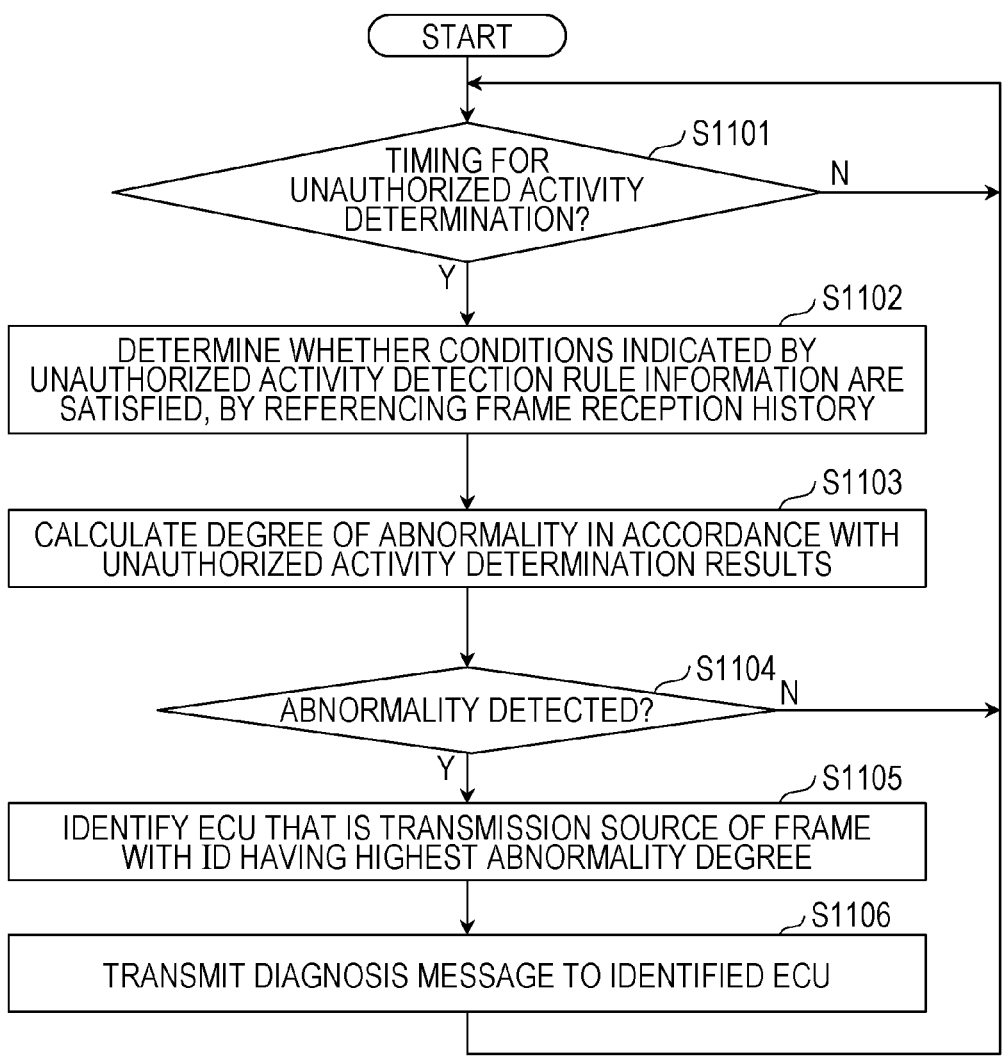
FIG. 11 is a flowchart illustrating an example of operations of the monitoring ECU according to the first embodiment.

FIG. 11 is a flowchart illustrating an example of operations of the monitoring ECU 100. The monitoring ECU 100 periodically performs unauthorized activity detection processing (unauthorized activity determination) every predetermined unit time (e.g., 100 ms). The monitoring ECU 100 stands by until the timing of the periodically-performed unauthorized activity determination (step S1101), and performs unauthorized activity determination by monitoring the bus 300 (step S1102).

In step S1102, the monitoring ECU 100 uses the unauthorized activity determination unit 130 to reference frame reception history stored in the frame reception history storing unit 160, and determines whether appropriate or unauthorized, based on whether or not rules (conditions) indicated in the unauthorized activity detection rule information stored in the unauthorized-activity-detection rule storing unit 170 have been satisfied.

The monitoring ECU 100 records the results of the determination in step S1102 made by the unauthorized activity determination unit 130 as unauthorized activity determination results in the unauthorized activity determination results storing unit 180, calculates the degree of abnormality in accordance with the unauthorized activity determination results, and records the calculated degree of abnormality by adding to the unauthorized activity determination results (step S1103). For example, if the calculated degree of abnormality is 0, this indicates that no abnormality was detected, and if the degree of abnormality is greater than 0, this indicates that an abnormality has been detected.

The monitoring ECU 100 distinguishes whether or not an abnormality has been detected as the result of the unauthorized activity determination (step S1104). In a case where no abnormality has been detected, the monitoring ECU 100 transitions to step S1101, and stands by for the next timing for unauthorized activity determination to arrive.

In a case where an abnormality (occurrence of an unauthorized state) has been detected, the monitoring ECU 100 decides the contents of handling processing by the unauthorized activity handling unit 140, as handling of the unauthorized activity. Specifically, in a case where an abnormality has been detected, the monitoring ECU 100 obtains information regarding the ECU transmitting the data frame having the ID with the highest degree of abnormality in the unauthorized activity determination results saved in the unauthorized activity determination results storing unit 180 and identifies the ECU, by referencing the ECU information table in the ECU information table storing unit 190 (step S1105), and transmits a diagnosis message regarding the identified ECU to that ECU, and confirms the state of that ECU by receiving diagnosis information from that ECU or the like, for example (step S1106). After step S1106, the bus 300 transitions to step S1101 and stands by for the next timing for unauthorized activity determination to arrive. In a case of having detected that an abnormality is occurring at that ECU by confirmation of the state of the ECU in step S1106, the monitoring ECU 100 may effect control such as notification of a warning to the driver of the vehicle or the like, notification of information to an external server, or other handling.

1.12 Monitoring Operations of Bus 300 in Onboard Network System 10

Figure 12:
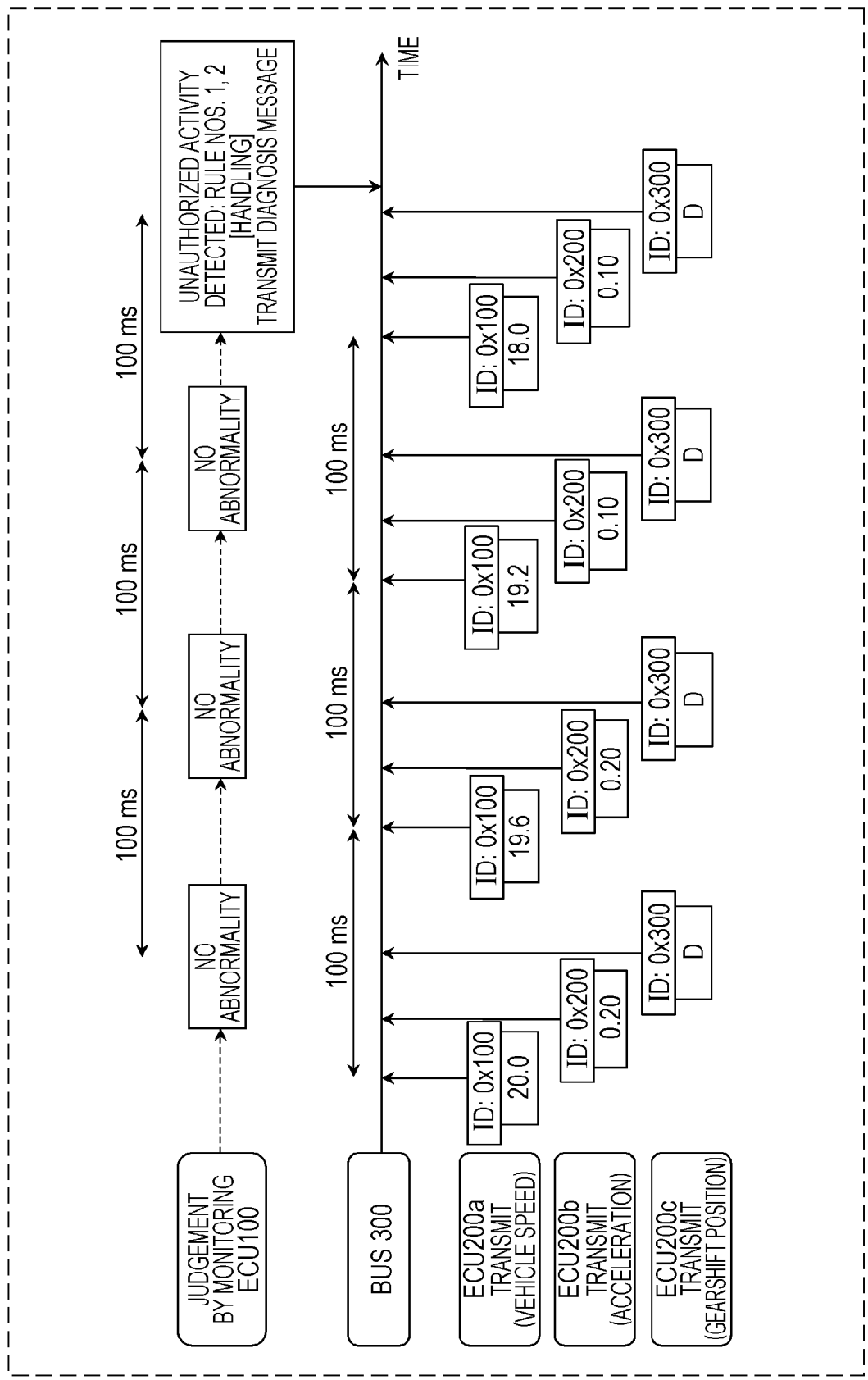
FIG. 12 is a diagram illustrating an operation example of bus monitoring in the onboard network system according to the first embodiment.

FIG. 12 is a diagram illustrating an example of operations of monitoring the bus 300 in the onboard network system 10. This example illustrates the way in which data frames of ID 0x100 (data frames indicating vehicle speed), data frames of ID 0x200 (data frames indicating acceleration), and data frames of ID 0x300 (data frames indicating the state of gearshift position) are periodically transmitted to the bus 300 from the ECU 200a, ECU 200b, and ECU 200c, respectively. This example further illustrates an example where the firmware of the ECU 200a is unauthorizedly rewritten by an attacker, and from a certain point the ECU 200a fabricates the vehicle speed notified from the speed sensor 210 and transmits a data frame indicating a wrong vehicle speed to the bus 300.

The monitoring ECU 100 periodically performs unauthorized activity determination (unauthorized activity detection processing) at 100 ms intervals, immediately after the timing of having received the data frame of ID 0x300. If the timing of performing this unauthorized activity determination is the end period of each unit time (100 ms), no unauthorized activity is detected by any of the rules of rule Nos. 1 through 3 indicated by the unauthorized activity detection rule information stored in the unauthorized-activity-detection rule storing unit 170 regarding the data frames received from the bus 300 at the first three unit times. Assuming that the integrated value of acceleration at the initial point in this example was 20.0 km/h, the integrated value of acceleration sequentially changes in the order of 20.072, 20.144, 20.18, and 20.21 km/h, through the reception of the data frames indicating the acceleration at the first time through the fourth time. The difference (amount of change) between the vehicle speed indicated by the data frame for vehicle speed received the fourth time (18.0 km/h) and the integrated value based on acceleration indicated by acceleration data frames (20.2 km/h) has exceeded 1.0 km/h, so the monitoring ECU 100 detects that the rule (condition) of rule No. 1 is not satisfied, and unauthorized activity is detected. Further, in a case where the state of the gearshift position indicated by the data frame received the fourth time is "D" (drive), the monitoring ECU 100 detects unauthorized activity regarding rule No. 2, since the amount in change of speed (the difference between the vehicle speed 18.0 km/h that the data frame for vehicle speed that has been received the fourth time and the vehicle speed 19.2 indicated by the data frame received the previous time) has exceeded 1.0 km/h. Accordingly, the monitoring ECU 100 identifies the transmission source of the data frames with the ID of 0x100, regarding which the degree of abnormality has been calculated 2 which is the highest due to not satisfying two rules (conditions), as being the ECU 200a, by referencing the ECU information table stored in the ECU information table storing unit 190. The monitoring ECU 100 then transmits a diagnosis message to the ECU 200a.

1.13 Advantages of First Embodiment

In the onboard network system 10 according to the first embodiment, the monitoring ECU 100 detects unauthorized activity based on the relation between contents of data frames having multiple IDs that are different from each other. Accordingly, even in a case where the firmware of an ECU is unauthorizedly rewritten by an attacker or an unauthorized program is executed in an ECU, and a data frame of unauthorized content is transmitted at a valid timing as a result, transmission of the unauthorized data frame can be detected from the breakdown in the relation of contents between data frames with different IDs. For example, even if an attacker takes over a certain ECU and transmits an unauthorized data frame, the unauthorized activity is detected based on the relation as to data frames transmitted by other ECUs, so it becomes more difficult for an attacker to attack without the unauthorized activity being detected.

The monitoring ECU 100 narrows down the ID of the unauthorized data frame and the ECU that is the transmitting source by calculating the degree of abnormality, based on the results of having performed unauthorized activity determination based on multiple conditions indicated by unauthorized activity detection rule information, and efficiently transmits diagnosis messages and so forth. Narrowing down the ECU to transmit a diagnosis message corresponding to the ECU in this way is useful to suppress increased traffic amount on the bus 300. Even in a case of performing processing other than transmission of a diagnosis message, narrowing down the ECU by calculation of degree of abnormality, to effectively handle an ECU that is the cause of an unauthorized state occurring, is useful.

Second Embodiment

An onboard network system 11 where part of the onboard network system 10 according to the first embodiment has been modified will be described below.

The monitoring ECU in the onboard network system 11 according to a second embodiment makes a comprehensive decision regarding handling processing, using a method of detecting occurrence of an unauthorized state based on rules (conditions) set for each ID regarding data frames of a single ID, besides the method of detecting occurrence of an unauthorized state based on the relation between contents of data frames having IDs different from each other (the unauthorized activity determination method described in the first embodiment.

2.1 Overall Configuration of Onboard Network System 11

Figure 13:
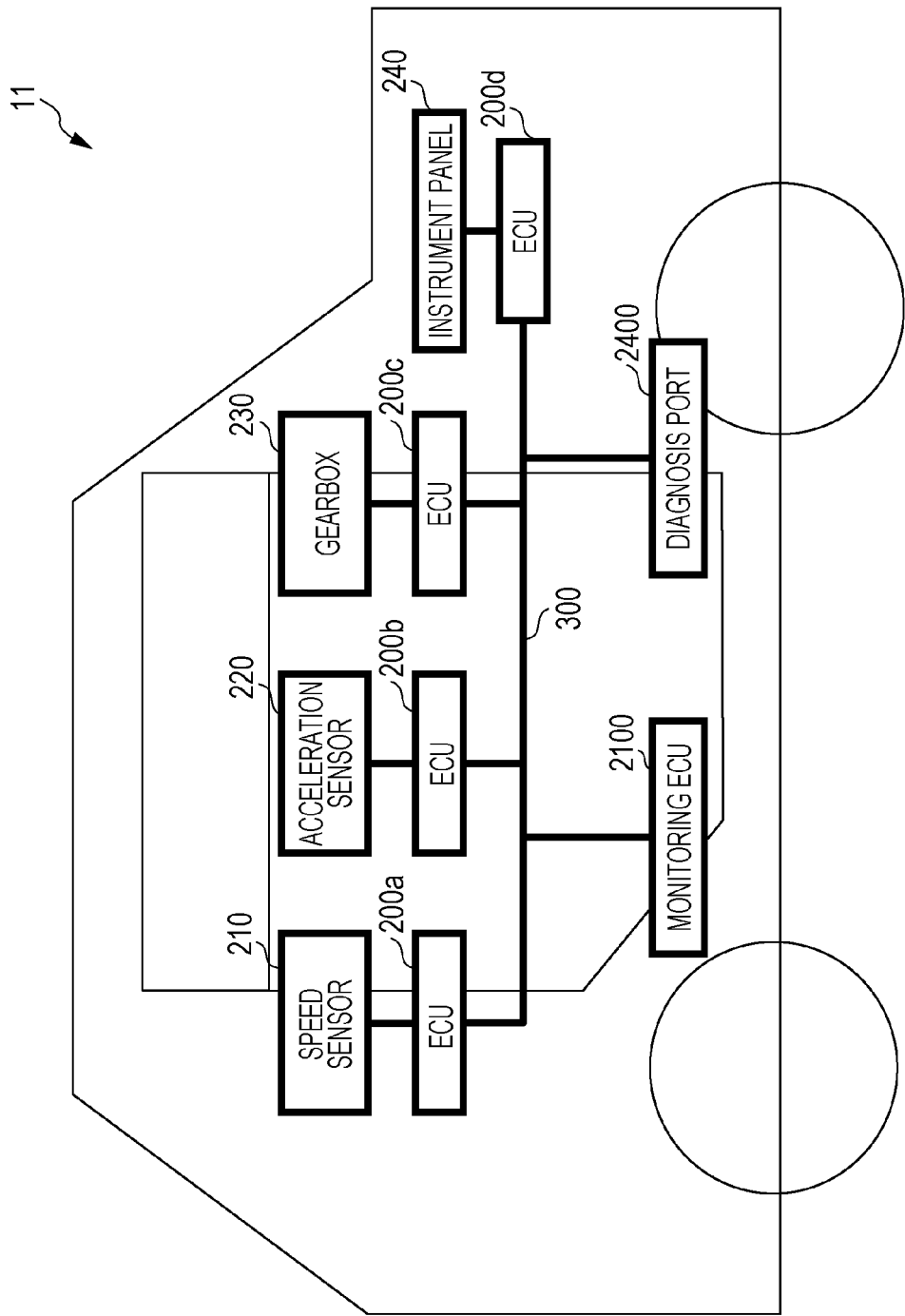
FIG. 13 is a diagram illustrating the overall configuration of an onboard network system according to a second embodiment.

FIG. 13 is a diagram illustrating the overall configuration of the onboard network system 11. The onboard network system 11 is configured including the bus 300, a monitoring ECU 2100, and the nodes connected to the bus 300, such as the ECUs like the ECU 200a, ECU 200b, ECU 200c, ECU 200d, and so forth, that are connected to various types of devices such as sensors and the like. The onboard network system 11 further includes a diagnosis port 2400 connected to the bus 300. The onboard network system 11 is the same as the onboard network system 10 (see FIG. 1) regarding points that are not described here in particular. Components that are the same as those in the onboard network system 10 are denoted in FIG. 13 by the same reference numerals as in FIG. 1, and description will be omitted here.

The monitoring ECU 2100 is a partial modification of the monitoring ECU 100 described in the first embodiment, and detects occurrence of an unauthorized state by monitoring data frames flowing over the bus 300 and determining whether or not an unauthorized data frame has been transmitted (unauthorized activity determination and intrusion determination). The monitoring ECU 2100 further decides the contents of handling processing in accordance with the state of the unauthorized data frame having been transmitted (the results of the unauthorized activity determination and intrusion determination), and performs handling processing.

The diagnosis port 2400 is a port that is accessible to the bus 300. Devices such as diagnostic tools and the like can access the bus 300 via the diagnosis port 2400. That is to say, diagnostic tools and the like can be connected to the diagnosis port 2400 to diagnose the state of the ECUS connected to the bus 300. It is conceivable that an attacker might transmit an unauthorized data frame via the diagnosis port 2400, to enable transmission/reception of data frames to and from the bus 300. Injection (transmission) of an unauthorized data frame to the bus 300 via the diagnosis port 2400 will also be referred to as intrusion here.

2.2 Configuration of Monitoring ECU 2100

Figure 14:
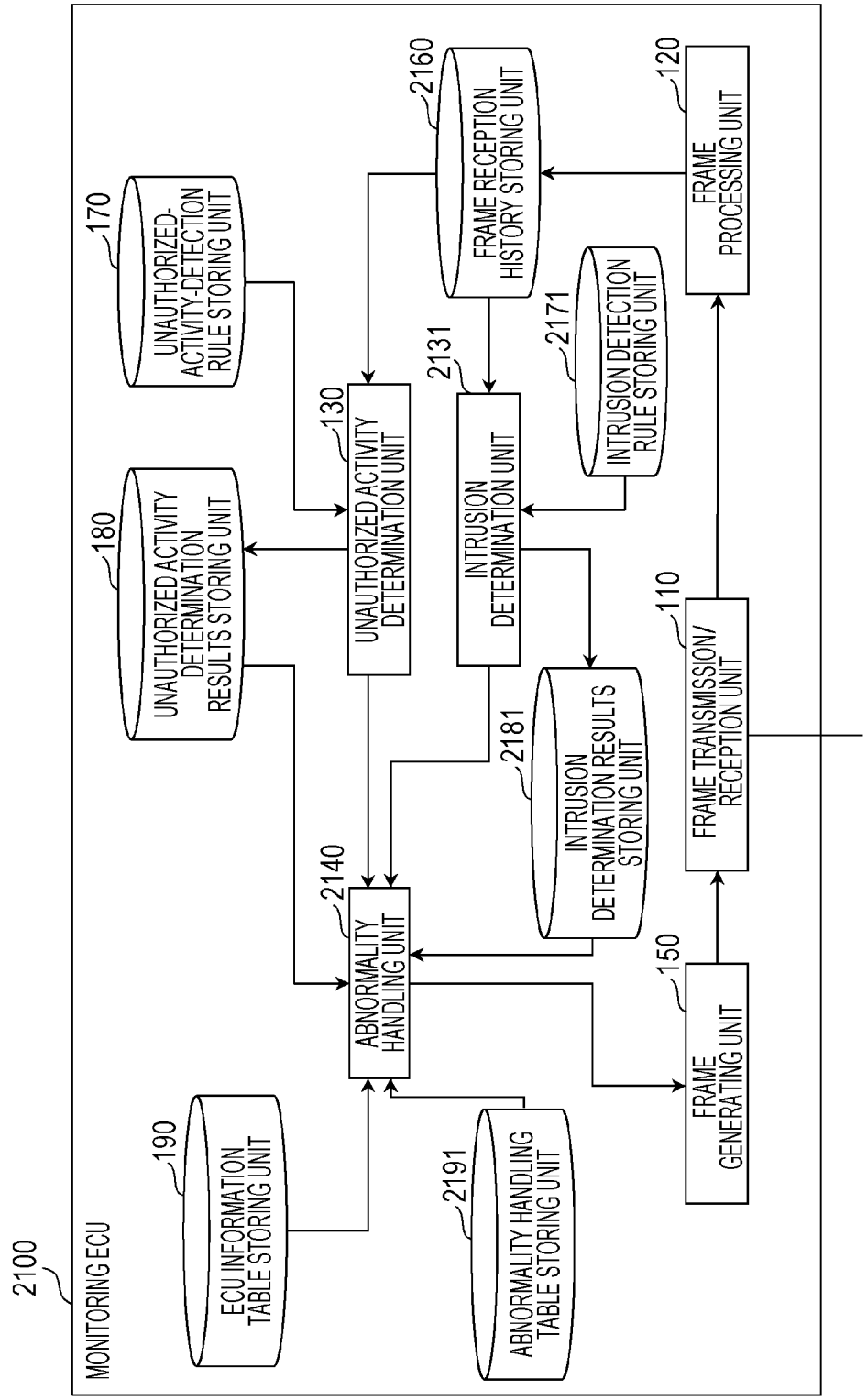
FIG. 14 is a configuration diagram of a monitoring ECU according to the second embodiment.

FIG. 14 is a configuration diagram of the monitoring ECU 2100. The monitoring ECU 2100 is configured including the frame transmission/reception unit 110, the frame processing unit 120, the unauthorized activity determination unit 130, an intrusion determination unit 2131, an abnormality handling unit 2140, the frame generating unit 150, a frame reception history storing unit 2160, the unauthorized-activity-detection rule storing unit 170, an intrusion detection rule storing unit 2171, the unauthorized activity determination results storing unit 180, an intrusion determination results storing unit 2181, the ECU information table storing unit 190, and an abnormality handling table storing unit 2191. Components that have the same functions as those in the first embodiment are denoted in FIG. 14 with the same reference numerals as in FIG. 4, and description will be omitted here. The components of the monitoring ECU 2100 illustrated in FIG. 14 can be realized by a storage medium such as memory or the like of the monitoring ECU 2100, a communication circuit, and a processor or the like that executes programs stored in memory.

The intrusion determination unit 2131 periodically performs determination of whether or not an unauthorized data frame has been externally injected into the bus 300 (intrusion determination relating to whether or not an unauthorized data frame has been injected) based on intrusion detection rule information that the intrusion detection rule storing unit 2171 stores, and frame reception history that the frame reception history storing unit 2160 stores, with a predetermined unit time (e.g., 100 ms) as a cycle. The intrusion determination unit 2131 updates intrusion determination results that the intrusion determination results storing unit 2181 stores, based on the results of the intrusion determination. The intrusion determination unit 2131 also notifies the abnormality handling unit 2140 that an intrusion has been detected, in a case where an intrusion has been determined as the results of the intrusion determination, i.e., in a case where occurrence of an abnormality has been detected.

Upon having been notified from the unauthorized activity determination unit 130 or intrusion determination unit 2131 that an unauthorized activity or intrusion has been detected (occurrence of abnormality), the abnormality handling unit 2140 decides the contents of handling processing to handle the abnormality, by referencing the unauthorized activity determination results stored in the unauthorized activity determination results storing unit 180, the intrusion determination results stored in the intrusion determination results storing unit 2181, the ECU information table stored in the ECU information table storing unit 190, and the abnormality handling table stored in the abnormality handling table storing unit 2191. In a case of having decided the handling processing, the abnormality handling unit 2140 effects control to execute that handling processing. For example, in a case where intrusion determination results that a data frame including a particular ID is abnormal (e.g., the data frame is unauthorized and also the calculated degree of abnormality is the highest, etc.), and intrusion determination results where intrusion has been determined regarding a data frame having that particular ID, the probability that an unauthorized data frame has been injected via the diagnosis port 2400 is high, so the abnormality handling unit 2140 requests the frame generating unit 150 to generate a data frame to be transmitted so as to prompt the user (driver or the like) to confirm whether or not an unauthorized device is connected to the diagnosis port 2400. As another example, in a case where intrusion determination results that intrusion of a data frame including a particular ID has not been detected, and unauthorized activity determination results that an abnormality of a data frame including that particular ID has been detected, are obtained, the probability that the firmware of an ECU has been unauthorizedly overwritten is high, so the abnormality handling unit 2140 references the ECU information table and requests the frame generating unit 150 to generate a diagnosis message for the ECU transmitting the relevant data frame.

The frame reception history storing unit 2160 stores frame reception history (see FIG. 15) that is information relating to data frames that the monitoring ECU 2100 has sequentially received.

The intrusion detection rule storing unit 2171 stores intrusion detection rules information (see FIG. 16) indicating conditions set for each ID, regarding data frames of a single ID, which the intrusion determination unit 2131 references for intrusion determination.

The intrusion determination results storing unit 2181 stores intrusion determination results (see FIG. 17), which are the results of the intrusion determination unit 2131 determining whether or not conditions indicated by the intrusion detection rule information are satisfied.

The abnormality handling table storing unit 2191 stores an abnormality handling table (see FIG. 18) used to decide appropriate handling processing contents as to occurrence of an unauthorized activity or intrusion, in accordance with the unauthorized activity determination results or intrusion determination results.

2.3 Frame Reception History

FIG. 15 illustrates an example of frame reception history that the frame reception history storing unit 2160 stores. The frame reception history is information relating to the contents of data frames that the monitoring ECU 2100 has received from the past until the present. The example in FIG. 15 shows, out of the frame reception history, the reception time of data frames received regarding three IDs, received from the present (newest) up to two times back, and particular values (values indicating each of the vehicle speed, acceleration and state of gearshift position) that the contents of the data indicate. This example indicates that, of data frames having the ID 0x100 relating to vehicle speed, the reception time of the newest data frame is 210 ms and the value of the vehicle speed indicated by the latest-received data frame is 18.0 km/h, the reception time one time back is 110 ms and the value of the vehicle speed in the received data frame is 19.2 km/h, and the reception time two times back is 10 ms and the received value is 19.6 km/h. This example also indicates that of data frames having the ID 0x200 relating to acceleration, the reception times of data frames received from the present up to two times back are 220 ms, 120 ms, and 20 ms, and the acceleration values indicated by the received data frames are 0.10 m/s$^2$, 0.10 m/s$^2$, and 0.20 m/s$^2$, respectively. This example also indicates that of data frames having the ID 0x300 relating to the state of gearshift position, the reception times of data frames received from the present up to two times back are 230 ms, 130 ms, and 30 ms, and gearshift position state values indicated by the data frames received all indicate a "D" (drive) state.

This frame reception history is used for unauthorized activity determination by the unauthorized activity determination unit 130 and intrusion determination by the intrusion determination unit 2131. Although values for the contents of data frames are only shown from those received from the newest up to two times back in FIG. 15, the frame reception history can be configured to include information necessary for the unauthorized activity determination unit 130 to perform unauthorized activity determination using the unauthorized activity detection rule information, and information necessary for the intrusion determination unit 2131 to perform intrusion determination using the intrusion detection rule information. For example, the frame reception history may be information indicating the contents of all data frames that the monitoring ECU 100 has received ever since the vehicle started traveling (e.g., from the time that the engine was started). Note that the frame reception history storing unit 2160 may have one region to store the integrated value of acceleration, for example.

2.4 Intrusion Detection Rule Information

FIG. 16 illustrates an example of intrusion detection rule information that the intrusion detection rule storing unit 2171 stores. The intrusion detection rule information includes, for each ID, conditions (rules) to be satisfied by data frames having that ID. Whether or not conditions indicated by the intrusion detection rule information are satisfied is confirmed at the intrusion determination unit 2131 for intrusion determination. The intrusion determination unit 2131 detects intrusion by detecting a data frame that does not satisfy the conditions. In the example of FIG. 16, the intrusion detection rule information indicates, for each ID, reception interval, margin, and amount of change in data, as condition stipulations. The reception interval indicates the interval at which data frames of the corresponding ID are received, and margin indicates the tolerance range for variance in the reception interval. In the example in FIG. 16, the reception interval of data frames of which the ID is 0x100 is 100 ms and the margin is 5 ms, for example, so this condition is satisfied if an interval between data frames of ID 0x100 is in the range of 95 ms to 105 ms, and when the condition is satisfied, determination is made in the intrusion determination that this is normal (not an intrusion). In a case where the condition is not satisfied, determination is made in the intrusion determination that is abnormal (intrusion detected). The amount of change in data indicates a condition regarding the upper limit in the amount of change between a data value extracted from the data field of the data frame received the previous time and a data value extracted from the data field of the data frame that is currently received (difference in values). In the example in FIG. 16, the amount of change in data regarding the data frame of which the ID is 0x100 (vehicle speed) is 2 km/h for example, so as long as the amount of change between data in the data frames of ID 0x100 that are consecutively received is change within 2 km/h, the upper limit condition is satisfied, and when the condition is satisfied, determination is made in the intrusion determination that this is normal (not an intrusion). For example, in a case where the monitoring ECU 2100 receives a data frame of ID 0x100 indicating vehicle speed of 19.2 km/h, if the value for vehicle speed of the data frame of ID 0x100 received next is between 17.2 to 21.2 km/h, this is determined to be normal. In a case where the condition is not satisfied, determination is made in the intrusion determination that is abnormal (intrusion detected). In the example in FIG. 16, the conditions regarding data frames of which the ID is 0x200 are stipulated to be reception interval of 100 ms, margin of 5 ms, and amount of change in data of 5 m/s$^2$. Further, the conditions regarding data frames of which the ID is 0x300 are reception interval of 100 ms, and margin of 5 ms, but nothing is stipulated regarding the amount of change in data. This means that there are no conditions relating to the amount of change in data. In this way, it is useful to have conditions stipulated as conditions regarding data frames of each ID indicated by intrusion detection rule information so that, in a state where normal data frames with that ID are being periodically transmitted, the conditions are no longer satisfied when an unauthorized data frame having that ID is externally injected, due to discrepancy as to normal data frames. The conditions in the example in FIG. 16 have been stipulated in light of the possibility that coexistence of normal data frames and an unauthorized data frame externally injected will cause conditions relating to reception interval and amount of change in data to not be satisfied.

2.5 Intrusion Determination Results

FIG. 17 illustrates an example of intrusion determination results that the intrusion determination results storing unit 2181 stores. The intrusion determination results in the example in FIG. 17 indicate whether the intrusion determination unit 2131 has determined each ID of the data frames to be normal (no intrusion) or abnormal (intrusion detected) as the intrusion determination results, based on the conditions for the data frames of those IDs. The example in FIG. 17 indicates that the data frame of the ID 0x100 has been determined to be normal, the data frame of the ID 0)(200 has been determined to be abnormal, and the data frame of the ID 0x300 has been determined to be normal by the determination unit determination unit intrusion determination unit 2131.

2.6 Abnormality Handling Table

FIG. 18 illustrates an example of the abnormality handling table that the abnormality handling table storing unit 2191 stores. The abnormality handling unit 2140 references this abnormality handling table and decides the content of handling processing, to handle an abnormality based on the unauthorized activity determination results and intrusion determination results. The way of handling changes depending on the combination of unauthorized activity determination results and intrusion determination results, as illustrated in FIG. 18. In the example in FIG. 18, the abnormality handling table indicates that in a case where the unauthorized activity determination results are normal (e.g., the degree of abnormality is 0) and the intrusion determination results are normal, nothing is done in particular as handling processing (no measure are taken).

Also, in a case where the unauthorized activity determination results are abnormal (e.g., the degree of abnormality is greater than 0) but the intrusion determination results are normal, the abnormality handling table in this example indicates that the content of handling processing is to transmit a diagnosis message to the ECU that is the transmission source of the abnormal data frame, to confirm the situation. There is a possibility that the firmware of the relevant ECU has been unauthorizedly rewritten, since there has been no unauthorized message (data frame for attack) externally injected but there is a breakdown in the relation between contents of data frames having IDs different from each other, so transmission of this diagnosis message to the relevant ECU is useful processing to handle this.

Also, in a case where the unauthorized activity determination results are normal but the intrusion determination results are abnormal, the abnormality handling table in this example indicates that the content of handling processing is to make a notification to the user to confirm the interface of connecting an external device, such as the diagnosis port 2400 or the like. The ECU is not taken over by an attacker rewriting the firmware of the ECU or the like, but there is a possibility that an attempt is being made to perform an attack by retransmitting a normal message from the outside, so this notification to the user is useful processing to handle this. Notification to the user can be realized by, for example, effecting control so that a data frame of a predetermined ID is transmitted from the monitoring ECU 2100 to the bus 300, and upon the ECU 200d receiving the data frame of the predetermined ID, a message decided beforehand is displayed on the instrument panel 240.

Also, in a case where the unauthorized activity determination results are abnormal and also the intrusion determination results are abnormal, the abnormality handling table in this example indicates that the content of handling processing is to make a notification to the user to confirm the interface of connecting an external device, such as the diagnosis port 2400 or the like, and also to transmit a frame notifying the ECUs that an abnormality is occurring (abnormality notification message). This is an example of handling in a case where there is a possibility that an ECU has been taken over by an attack frame having been externally injected, and the level of danger of the vehicle being controlled is thought to be high. The ECUs of the onboard network system 11 can be configured so that in a case of having an abnormality notification message, security measures set beforehand (e.g., driving control where the vehicle is made to decelerate and stop or the like, limitation of automatic driving functions, etc.) are carried out.

2.7 Operations of Monitoring ECU 2100

Figure 19:
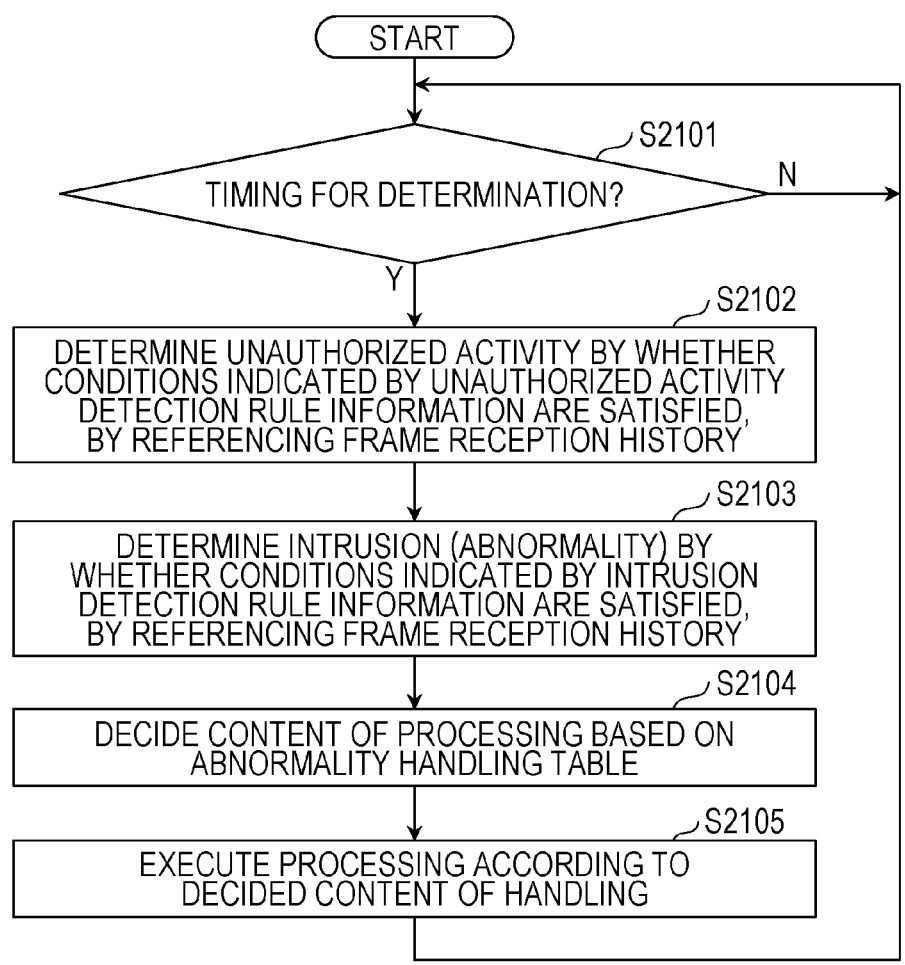
FIG. 19 is a flowchart illustrating an example of operations of the monitoring ECU according to the second embodiment.

FIG. 19 is a flowchart illustrating an example of operations of the monitoring ECU 2100. The monitoring ECU 2100 periodically performs unauthorized activity detection processing (unauthorized activity determination) and intrusion detection processing (intrusion determination) every predetermined unit time (e.g., 100 ms).

The monitoring ECU 2100 stands by until the timing of the periodically-performed unauthorized activity determination (step S2101), and performs unauthorized activity determination by monitoring the bus 300 (step S2102). In step S2102, the monitoring ECU 2100 uses the unauthorized activity determination unit 130 to reference the frame reception history stored in the frame reception history storing unit 2160, and determines whether appropriate or unauthorized, based on whether or not the rules (conditions) that the unauthorized activity detection rule information stored in the unauthorized-activity-detection rule storing unit 170 indicates have been satisfied. Note that the unauthorized activity determination unit 130 stores the unauthorized activity determination results in the unauthorized activity determination results storing unit 180, and adds the calculation results for the degree of abnormality to the unauthorized activity determination results.

Next, the monitoring ECU 2100 performs intrusion determination (step S2103). In step S2103, the monitoring ECU 2100 uses the intrusion determination unit 2131 to reference the frame reception history stored in the frame reception history storing unit 2160, and determines whether normal or abnormal (intrusion detected), based on whether or not the intrusion detection rule information stored in the intrusion detection rule storing unit 2171 has been satisfied. The intrusion determination unit 2131 stores the intrusion determination results in the intrusion determination results storing unit 2181.

Next, the monitoring ECU 2100 decides the contents of handling processing in accordance with the abnormality handling table stored in the abnormality handling table storing unit 2191, based on the unauthorized activity determination results and intrusion determination results (step S2104).

The monitoring ECU 2100 then executes the handling processing of the contents decided in step S2104 (step S2105), and transitions to step S2101. Note that the monitoring ECU 2100 does not perform any handling processing in particular in a case where both the unauthorized activity determination results and the intrusion determination results are normal.

2.8 First Example of Monitoring Operations of Bus 300 in Onboard Network System 11

Figure 20:
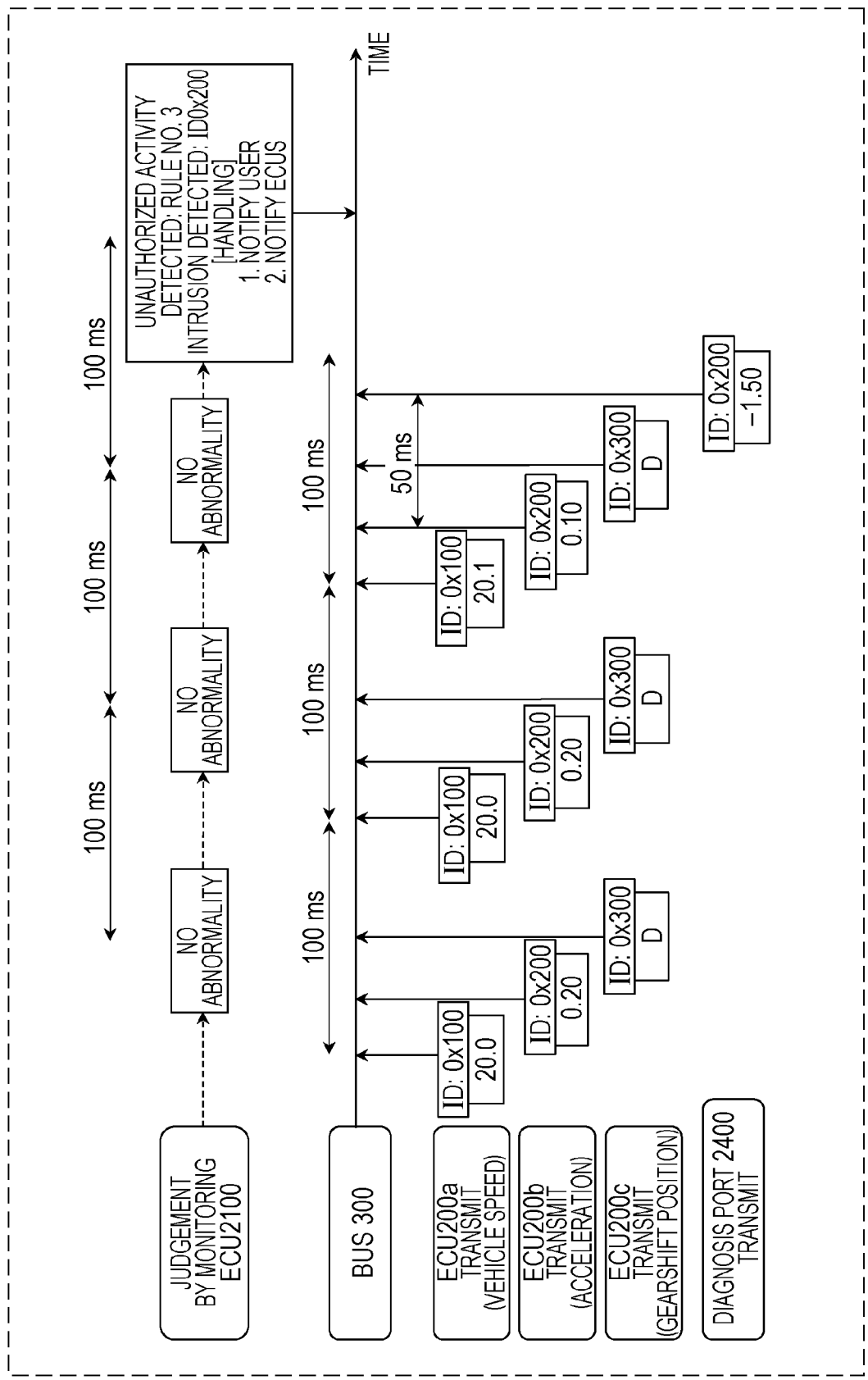
FIG. 20 is a diagram illustrating a first operation example of bus monitoring in the onboard network system according to the second embodiment.

FIG. 20 is a diagram illustrating a first example of operations of monitoring the bus 300 in the onboard network system 11. This example illustrates the way in which data frames of ID 0x100 (data frames indicating vehicle speed), data frames of ID 0x200 (data frames indicating acceleration), and data frames of ID 0x300 (data frames indicating the state of the gearshift position) are periodically transmitted to the bus 300 from the ECU 200a, ECU 200b, and ECU 200c, respectively. This example further illustrates an example where an attacker injects (transmits) an unauthorized data frame with the ID of 0x200 from the diagnosis port 2400 at some point.

The monitoring ECU 2100 monitors the bus 300, and when an unauthorized data frame (a data frame indicating acceleration of −1.50) having the ID 0x200 being injected from the diagnosis port 2400, the condition of rule No. 3 (the condition relating to the relation between the gearshift position state "D" and the amount of change in acceleration) indicated in the unauthorized activity detection rule information (see FIG. 6) is no longer satisfied. Accordingly, the monitoring ECU 2100 determines that there is unauthorized activity in the unauthorized activity determination, thereby detecting an abnormality. Also, injection of this unauthorized data frame causes the reception interval of the data frame of ID 0x200 to be 50 ms, so the condition stipulated for the reception interval and margin of data frames of ID 0x200, indicated in the intrusion detection rule information (see FIG. 16) is no longer satisfied. Accordingly, the monitoring ECU 2100 detects an abnormality in the intrusion determination. An abnormality has been detected in both of the unauthorized activity determination and the intrusion determination, so the monitoring ECU 2100 prompts the user to confirm the diagnosis port 2400, and also executes handling processing (transmission of a data frame that has been set beforehand or the like) to notify the ECUs that an abnormality is occurring on the onboard network system, in accordance with the abnormality handling table (see FIG. 18).

2.9 Second Example of Monitoring Operations of Bus 300 in Onboard Network System 11

Figure 21:
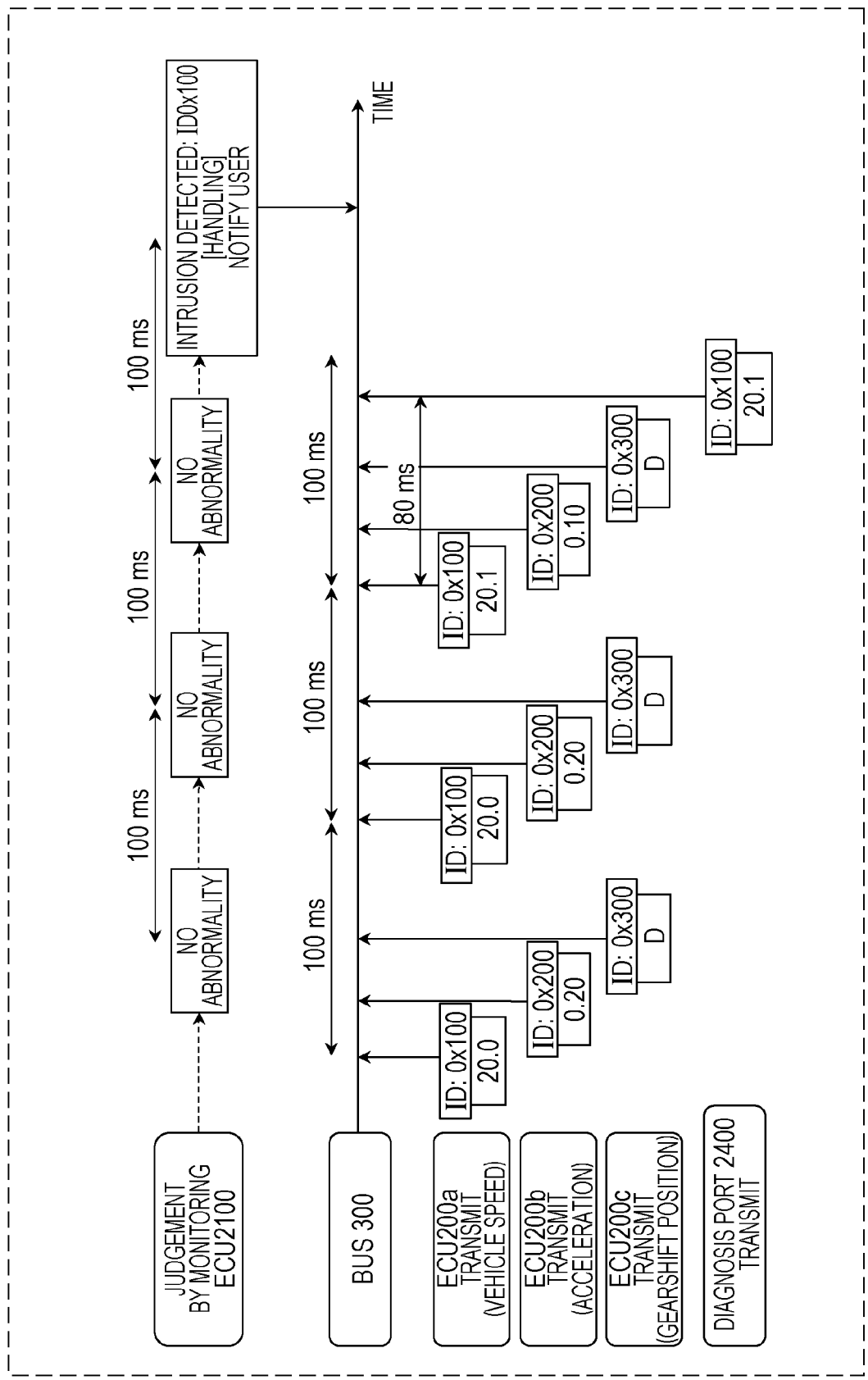
FIG. 21 is a diagram illustrating a second operation example of bus monitoring in the onboard network system according to the second embodiment.

FIG. 21 is a diagram illustrating a second example of operations of monitoring the bus 300 in the onboard network system 11. This example illustrates the way in which data frames indicating vehicle speed, data frames indicating acceleration, and data frames indicating the state of the gearshift position are periodically transmitted to the bus 300 from the ECU 200a, ECU 200b, and ECU 200c, respectively. This example further illustrates an example where an attacker injects (transmits) an unauthorized data frame with the ID of 0x100 from the diagnosis port 2400 at some point.

In this example, injection of the unauthorized data frame from the diagnosis port 2400 causes the reception interval of the data frame of ID 0x100 to be 80 ms, so the condition stipulated for the reception interval and margin of data frames of ID 0x100, indicated in the intrusion detection rule information is no longer satisfied. Accordingly, the monitoring ECU 2100 detects an abnormality in the intrusion determination, even though determination of unauthorized activity is not made (i.e., no abnormality is detected). An abnormality has been detected in just the intrusion determination, so the monitoring ECU 2100 executes handling processing prompting the user to confirm the diagnosis port 2400 (transmission of a data frame that has been set beforehand or the like), in accordance with the abnormality handling table (FIG. 18).

2.10 Advantages of Second Embodiment

In the onboard network system 11 according to the second embodiment, the monitoring ECU 2100 performs intrusion determination to detect intrusion based on conditions set for each ID regarding data frames of a single ID, besides detecting unauthorized activity based on the relation between data frames having multiple IDs that are different from each other. The content of handling processing is decided in accordance with the combination of the unauthorized activity determination results and intrusion determination results, and the handling processing is executed. Accordingly, even in a case where the firmware of an ECU is unauthorizedly rewritten by an attacker or an unauthorized program is executed in an ECU, and a data frame of unauthorized content is transmitted at a valid timing as a result, transmission of the unauthorized data frame can be detected from the breakdown in the relation of contents between data frames with different IDs. For example, even if an attacker takes over a certain ECU and transmits an unauthorized data frame, the unauthorized activity is detected based on the relation as to data frames transmitted by other ECUs, so it becomes more difficult for an attacker to attack without the unauthorized activity being detected. Further, cases where an attacker externally injects an unauthorized data frame can also be appropriately detected, and appropriate handling corresponding to the state of attack can be realized in accordance with the combination of the unauthorized activity determination results and intrusion determination results.

Third Embodiment

An onboard network system 12 where part of the onboard network system 11 according to the second embodiment has been modified will be described below. The monitoring ECU in the onboard network system 12 according to a third embodiment makes a comprehensive decision regarding handling processing, using a method of whether nor not verification of a message authentication code (MAC) attached to a data frame is successful, besides the method of detecting occurrence of an unauthorized state based on the relation between contents of data frames having IDs different from each other and the method of detecting occurrence of an unauthorized state based on rules (conditions) set for each ID regarding data frames of a single ID.

3.1 Overall Configuration of Onboard Network System 12

Figure 22:
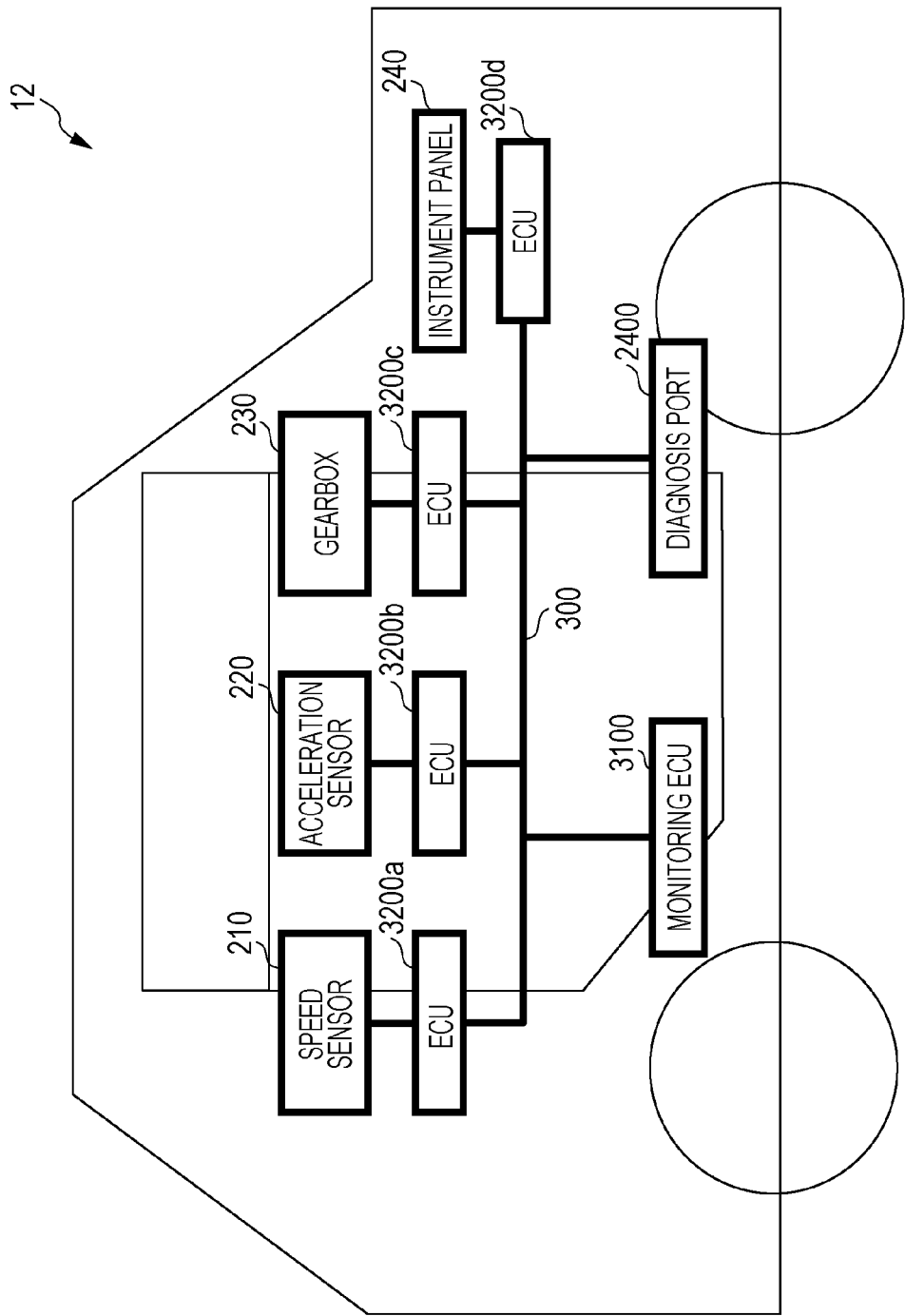
FIG. 22 is a diagram illustrating the overall configuration of an onboard network system according to a third embodiment.

FIG. 22 is a diagram illustrating the overall configuration of the onboard network system 12. The onboard network system 12 is configured including the bus 300, a monitoring ECU 3100, and the nodes connected to the bus 300, such as the ECUs like an ECU 3200a, an ECU 3200b, an ECU 3200c, an ECU 3200d, and so forth, that are connected to various types of devices such as sensors and the like, and the diagnosis port 2400 connected to the bus 300. The onboard network system 12 is the same as the onboard network system 11 illustrated in the second embodiment (see FIG. 13) regarding points that are not described here in particular. Components that are the same as those in the onboard network system 11 are denoted in FIG. 22 by the same reference numerals as in FIG. 13, and description will be omitted here.

The monitoring ECU 3100 is a partial modification of the monitoring ECU 2100 described in the second embodiment, and detects occurrence of an unauthorized state by monitoring data frames flowing over the bus 300 and determining whether or not an unauthorized data frame has been transmitted (unauthorized activity determination and intrusion determination). The monitoring ECU 3100 further verifies MACs attached to the data frames flowing over the bus 300, decides the contents of handling processing in accordance with MAC verification results and the state of the unauthorized data frame having been transmitted (the results of the unauthorized activity determination and intrusion determination), and performs handling processing.

The ECU 3200a, ECU 3200b, ECU 3200c, and ECU 3200d are connected to the bus 300, and respectively connected to the speed sensor 210, acceleration sensor 220, transmission 230, and instrument panel 240. The ECU 3200a periodically obtains speed of the vehicle from the speed sensor 210, and periodically transmits data frames including information of the obtained speed and a MAC to the bus 300. The ECU 3200b periodically obtains acceleration of the vehicle from the acceleration sensor 220, and periodically transmits data frames including information indicating the obtained acceleration and a MAC to the bus 300. The ECU 3200c periodically obtains the state of the transmission 230 and periodically transmits data frames including information of the state of the transmission 230 and a MAC to the bus 300. The ECU 3200d receives the data frames including information of the speed of the vehicle or information of the state of the gearshift position, performs verification of the MACs attached to the data frames, and (in a case where a MAC is verified to be valid), updates information displayed on the instrument panel 240.

The monitoring ECU 3100, ECU 3200a, ECU 3200b, ECU 3200c, and ECU 3200d share a common secret key, and generate and verify MACs using an Advanced Encryption Standard cipher-based MAC (AES-CMAC) algorithm. The ECUs exchange frames in accordance with the CAN protocol in the onboard network system 12.

3.2 Configuration of Monitoring ECU 3100

Figure 23:
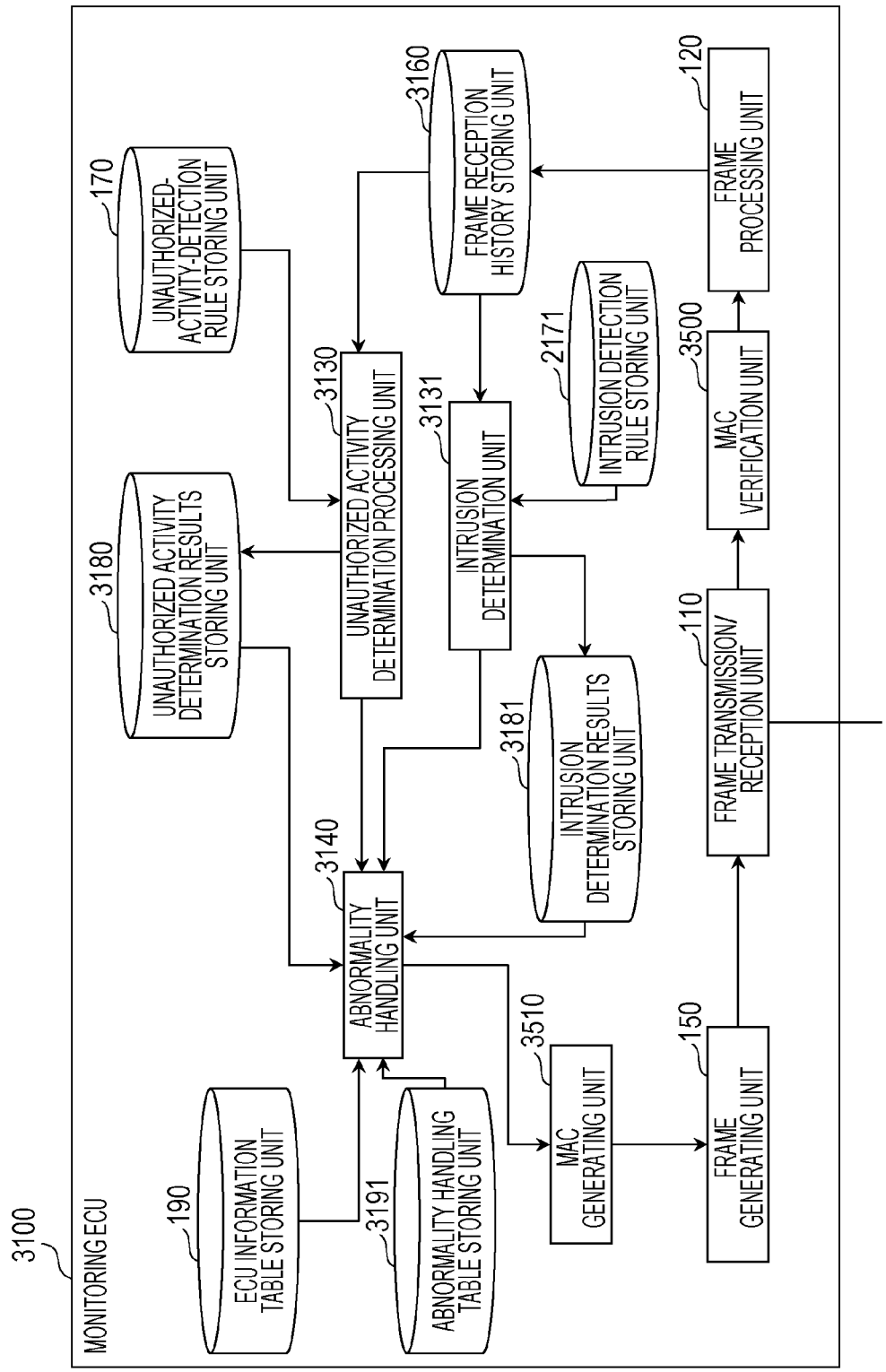
FIG. 23 is a configuration diagram of a monitoring ECU according to the third embodiment.

FIG. 23 is a configuration diagram of the monitoring ECU 3100. The monitoring ECU 3100 is configured including the frame transmission/reception unit 110, the frame processing unit 120, an unauthorized activity determination unit 3130, an intrusion determination unit 3131, an abnormality handling unit 3140, the frame generating unit 150, a MAC verification unit 3500, a MAC generating unit 3510, a frame reception history storing unit 3160, the unauthorized-activity-detection rule storing unit 170, the intrusion detection rule storing unit 2171, an unauthorized activity determination results storing unit 3180, an intrusion determination results storing unit 3181, the ECU information table storing unit 190, and an abnormality handling table storing unit 3191. Components that have the same functions as those in the monitoring ECU 100 according to the first embodiment or the monitoring ECU 2100 according to the second embodiment are denoted in FIG. 23 with the same reference numerals as in FIGS. 4 and 14, and description will be omitted here. The components of the monitoring ECU 3100 illustrated in FIG. 23 can be realized by a storage medium such as memory or the like of the monitoring ECU 3100, a communication circuit, and a processor or the like that executes programs stored in memory.

The unauthorized activity determination unit 3130 is a partial modification of the unauthorized activity determination unit 130 illustrated in the first embodiment, and periodically determines, using a predetermined unit of time (e.g., 100 ms) as a cycle, whether or not an unauthorized data frame has been received (unauthorized activity determination retarding to whether or not an unauthorized data frame has been transmitted), based on unauthorized activity detection rule information stored in the unauthorized-activity-detection rule storing unit 170 and frame reception history including MAC verification results stored in the frame reception history storing unit 3160. The unauthorized activity determination unit 3130 is the same as the unauthorized activity determination unit 130 regarding points not illustrated here in particular. The unauthorized activity determination unit 3130 updates unauthorized activity determination results stored in the unauthorized activity determination results storing unit 3180, based on the results of unauthorized activity determination. In a case where unauthorized activity has been detected as a result of the unauthorized activity determination (i.e., in a case where occurrence of a state of unauthorized activity has been detected), the unauthorized activity determination unit 3130 notifies the unauthorized activity handling unit 3140 that unauthorized activity has been detected.

The intrusion determination unit 3131 periodically performs determination of whether or not an unauthorized data frame has been externally injected into the bus 300 (intrusion determination relating to whether or not an unauthorized data frame has been injected) based on intrusion detection rule information that the intrusion detection rule storing unit 2171 stores, and frame reception history that the frame reception history storing unit 3160 stores, with a predetermined unit time (e.g., 100 ms) as a cycle. The intrusion determination unit 3131 updates intrusion determination results that the intrusion determination results storing unit 3181 stores, based on the results of the intrusion determination. The intrusion determination unit 3131 also notifies the abnormality handling unit 3140 that an intrusion has been detected, in a case where an intrusion has been determined as the results of the intrusion determination, i.e., in a case where occurrence of an abnormality has been detected.

Upon having been notified from the unauthorized activity determination unit 3130 or intrusion determination unit 3131 that an unauthorized activity or intrusion has been detected (occurrence of abnormality), the abnormality handling unit 3140 decides the contents of handling processing to handle the abnormality, by referencing the unauthorized activity determination results stored in the unauthorized activity determination results storing unit 3180, the intrusion determination results stored in the intrusion determination results storing unit 3181, the ECU information table stored in the ECU information table storing unit 190, and the abnormality handling table stored in the abnormality handling table storing unit 3191. In a case of having decided the handling processing, the abnormality handling unit 3140 effects control to execute that handling processing. For example, in a case where MAC verification has been successful but the unauthorized activity determination results indicate an abnormality and the intrusion determination results do not indicate an abnormality, the probability that the firmware of an ECU has been unauthorizedly overwritten and the verification key (secret key used for generating MACs) is being used is high, so the abnormality handling unit 3140 requests the frame generating unit 150 to generate a diagnosis message to be transmitted to the ECU that is the transmission source of the data frame relating to the abnormality, and further requests the frame generating unit 150 to generate an updating message that has been set beforehand (data frame for updating) to be transmitted to the other ECUs to prompt updating secret keys.

Figure 24:
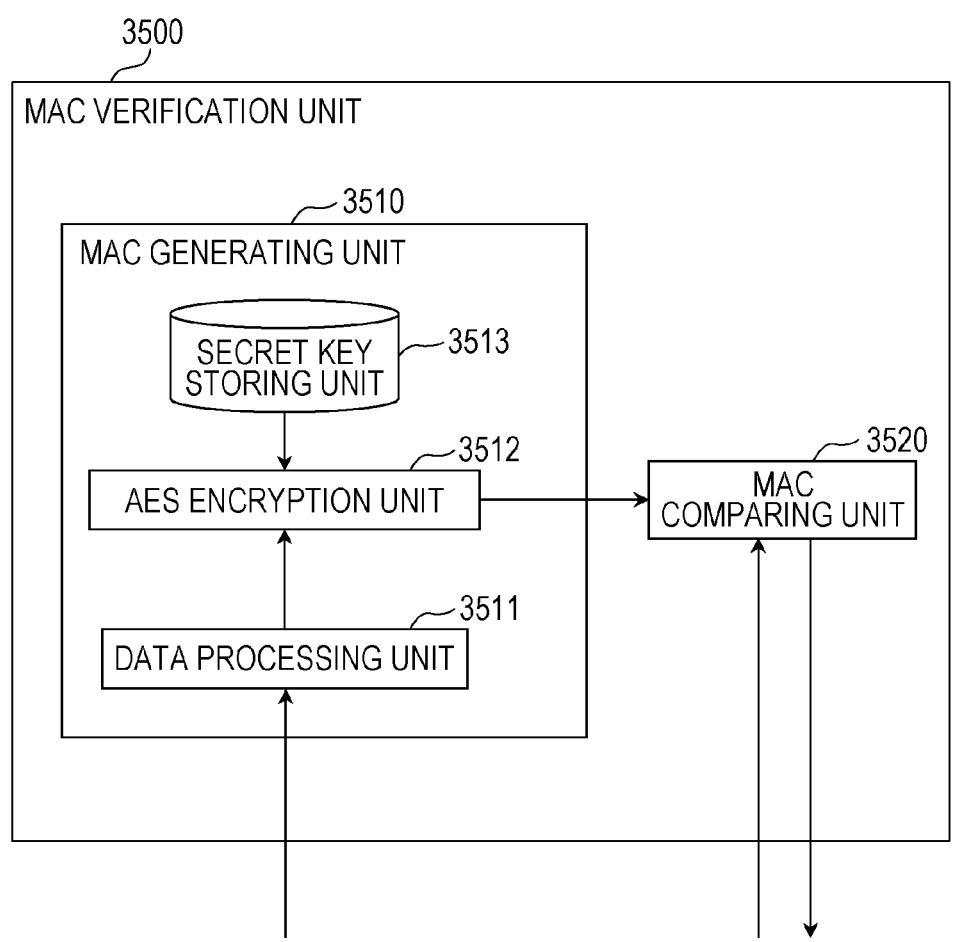
FIG. 24 is a configuration diagram of a MAC verification unit of the monitoring ECU according to the third embodiment.

The MAC verification unit 3500 is configured including the MAC generating unit 3510 and the MAC comparing unit 3520, as illustrated in FIG. 24. The MAC generating unit 3510 is configured including a data processing unit 3511, an AES encryption unit 3512, and a secret key storing unit 3513. The data processing unit 3511 extracts, from a received data frame, a portion set to be used for MAC generation (e.g., linking the ID and the portion of the data frame other than the MAC), and performs processing such as padding or the like so as to match the input side of the AES encryption unit 3512. The AES encryption unit 3512 is implemented as an encryption function or the like for example, and encrypts data processed by the data processing unit 3511 using the secret key that the secret key storing unit 3513 stores, generates part of the value obtained by encryption as a MAC, and notifies the MAC comparing unit 3520. The data processing unit 3511 may include a counter value that is sequentially incremented in the data to be encrypted, as a countermeasure to replay attacks. The MAC comparing unit 3520 compares the MAC notified from the MAC generating unit 3510 and the MAC included in the data field of the data frame that has been received, and judges whether or not they are equal. The MAC verification unit 3500 outputs verification results indicating that the MAC is valid (verification was successful) in a case where both MACs are equal from the comparison at the MAC comparing unit 3520, and outputs verification results indicating that the MAC is unauthorized (verification was not successful) in a case where the MACs are not equal. Note that the MAC verification results by the MAC verification unit 3500 are notified to the frame processing unit 120 along with the information of the data frame received by the frame transmission/reception unit 110. The frame processing unit 120 updates information relating to each data frame (frame reception history) stored in the frame reception history storing unit 3160, based on the obtained data frame information and the MAC verification results.

The frame reception history storing unit 3160 stores frame reception history (see FIG. 25) that is information relating to data frames that the monitoring ECU 3100 has sequentially received and is information including MAC verification results.

The unauthorized activity determination results storing unit 3180 stores unauthorized activity determination results (see FIG. 26) which are the results of the unauthorized activity determination unit 3130 having determined whether or not rules (conditions) indicated by unauthorized activity detection rule information is conformed to.

The intrusion determination results storing unit 3181 stores intrusion determination results (see FIG. 27) which are results of the intrusion determination unit 3131 having determined whether or not conditions indicated by the intrusion detection rule information are satisfied.

The abnormality handling table storing unit 3191 stores an abnormality handling table (see FIG. 28) used to decide handling processing contents appropriate for occurrence of unauthorized activity or intrusion, in accordance with the unauthorized activity determination results, intrusion determination results, and MAC verification results.

3.3 Frame Reception History

FIG. 25 illustrates an example of frame reception history that the frame reception history storing unit 3160 stores. The frame reception history is information relating to the contents and MAC verification results of data frames that the monitoring ECU 3100 has received from the past until the present. In the example in FIG. 25, of the frame reception history, reception time of data frames received regarding each of three IDs from the present (newest) up to two times back, MAC verification results, and particular values (values indicating each of the vehicle speed, acceleration and state of gearshift position) that the contents of the data frames indicate. This example indicates that, of data frames having the ID 0x100 relating to vehicle speed, the reception time of the newest data frame is 210 ms, the MAC is valid, and the value of the vehicle speed indicated by the latest-received data frame is 18.0 km/h, the reception time of the data frame received one time back is 110 ms, the MAC is valid, and the value of the vehicle speed indicated therein is 19.2 km/h, and the reception time of the data frame received two times back is 10 ms, the MAC is unauthorized, and the value of the vehicle speed indicated therein is 0.0 km/h. This example also indicates that of data frames having the ID 0x200 relating to acceleration, the reception times of data frames received from the present up to two times back are 220 ms, 120 ms, and 20 ms, the acceleration values indicated by the data frames are 0.1 m/s$^2$, 0.10 m/s$^2$, and 0.20 m/s$^2$, respectively, and the MACs are all valid. This example also indicates that of data frames having the ID 0x300 relating to the state of gearshift position, the reception times of data frames received from the present up to two times back are 230 ms, 130 ms, and 30 ms, gearshift position state values indicated by the data frames received all indicate a "D" (drive) state, and the MACs are all valid.

This frame reception history is used for unauthorized activity determination by the unauthorized activity determination unit 3130 and intrusion determination by the intrusion determination unit 3131. Although values for the contents of data frames are only shown from those received from the newest up to two times back in FIG. 25, the frame reception history can be configured to include information necessary for the unauthorized activity determination unit 3130 to perform unauthorized activity determination using the unauthorized activity detection rule information, and information necessary for the intrusion determination unit 3131 to perform intrusion determination using the intrusion detection rule information. For example, the frame reception history may be information indicating the contents of all data frames that the monitoring ECU 3100 has received ever since the vehicle started traveling (e.g., from the time that the engine was started). Note that the frame reception history storing unit 3160 may have one region to store the integrated value of acceleration, for example.

3.4 Unauthorized Activity Determination Results

FIG. 26 illustrates an example of unauthorized activity determination results stored in the unauthorized activity determination results storing unit 3180. The example in FIG. 26 illustrates, with regard to each data frame ID (at the left end in FIG. 26), whether or not the unauthorized activity determination unit 3130 has determined to be unauthorized based on the conditions relating to the relation between a data frame of that ID and a data frame of another ID (i.e., whether determined to be valid). FIG. 26 further notes the rule No. regarding the rules (conditions) in the unauthorized activity detection rule information used for the determination. In the is example, the conditions of rule No. 1 and rule No. 2 are determined not to have been satisfied (i.e., determined to be unauthorized), while the conditions of rule No. 3 are determined to have been satisfied (i.e., determined to be valid).

Also added to the unauthorized activity determination results by the unauthorized activity determination unit 3130 is the degree of abnormality calculated in accordance with the count of determination (detection) of unauthorized activity regarding the frames of each ID. As illustrated in FIG. 26, the data frame of which the ID is 0x100 has been determined to be unauthorized under the condition of rule No. 1 and further has been determined to be unauthorized under the condition of rule No. 2, so the degree of abnormality is calculated to be 2. The data frame of which the ID is 0x200 has been determined to be unauthorized under the condition of rule No. 1, but has not been determined to be unauthorized under the condition of rule No. 3, so the degree of abnormality is calculated to be 1. The data frame of which the ID is 0x300 has been determined to be unauthorized under the condition of rule No. 2, but has not been determined to be unauthorized under the condition of rule No. 3, so the degree of abnormality is calculated to be 1.

Further added to the unauthorized activity determination results by the unauthorized activity determination unit 3130 for each ID is the number of times that the MAC verification results for data frames of that ID have been unauthorized. The unauthorized activity determination unit 3130 counts the number of times that the MAC verification results have been found to be unauthorized based on the frame reception history, and thereby adds the count results to the unauthorized activity determination results as an unauthorized MAC count.

3.5 Intrusion Determination Results

FIG. 27 illustrates an example of intrusion determination results that the intrusion determination results storing unit 3181 stores. The intrusion determination results in the example in FIG. 27 indicate whether the intrusion determination unit 3131 has determined each ID of the data frames to be normal (no intrusion) or abnormal (intrusion detected) as the intrusion determination results, based on the conditions for the data frames of those IDs.

Further added to the intrusion determination results are MAC verification results made by the intrusion determination unit 3131 for each ID, regarding data frames of that ID. The intrusion determination unit 3131 adds MAC validity verification results to the intrusion determination results, based on the frame reception history.

The example in FIG. 27 indicates that the intrusion determination unit 3131 has found the data frame of the ID 0x100 has been determined to be normal, and the data frames of the IDs 0x200 and 0x300 also to be normal. This example also indicates that an unauthorized MAC has been attached to the data frame of the ID 0x100, and valid MACs have been attached to the data frames of the IDs 0x200 and 0x300.

3.6 Abnormality Handling Table

FIG. 28 illustrates an example of the abnormality handling table that the abnormality handling table storing unit 3191 stores. The abnormality handling unit 3140 follows this abnormality handling table and decides the content of handling processing, to handle an abnormality based on the unauthorized activity determination results, intrusion determination results, and MAC verification results (whether the MAC is valid or not). The way of handling changes depending on the combination of unauthorized activity determination results, intrusion determination results, and MAC verification results, as illustrated in FIG. 28. The example in FIG. 28 indicates that in a case where the unauthorized activity determination results are normal (e.g., the degree of abnormality is 0), the intrusion determination results are normal, and the MAC is valid, nothing is done in particular as handling processing (no measure are taken). The abnormality handling table in this example also illustrates that in a case where the unauthorized activity determination results are normal and the intrusion determination results are normal but the MAC is unauthorized, the contents of handling processing are to confirm the situation by transmitting a diagnosis message to the ECU that is the transmission source of the data frame to which the unauthorized MAC has been attached, and to perform updating of the key (key updating processing, e.g., transmitting an updating message relating to updating of the secret key for MAC generation). This handling processing is processing performed in light of the possibility of a problem with secret key sharing among the ECUS, synchronization of the counter used as relay attack countermeasures, or the like, since the MAC was unauthorized. The ECUs may be configured to update keys, reset counters, and so forth, in a case of receiving an updating message. Note that in a case where an updating message is transmitted and the secret keys of the ECUs are updated, the monitoring ECU 3100 updates the secret key in the secret key storing unit 3513 by the same method used to handle that updating.

Also, in a case where the unauthorized activity determination results are abnormal (e.g., the degree of abnormality is greater than 0) but the intrusion determination results are normal and the MAC is valid, the abnormality handling table in this example indicates that the content of handling processing is to transmit a diagnosis message to the ECU that is the transmission source of the abnormal data frame, to confirm the situation, and to perform key updating processing. There is a possibility that the firmware of the relevant ECU has been unauthorizedly rewritten, since there has been no unauthorized message (data frame for attack) externally injected but there is a breakdown in the relation between contents of data frames having IDs different from each other, so transmission of this diagnosis message to the relevant ECU is useful processing to handle this, since the MAC is valid so there is a possibility that the secret key has been leaked. The abnormality handling table in this example also illustrates that in a case where the unauthorized activity determination results are abnormal, the intrusion determination results are normal, and the MAC is unauthorized, the contents of handling processing are to confirm the situation by transmitting a diagnosis message to the ECU that is the transmission source of the abnormal data frame. This handling processing is useful handling, since an unauthorized message has not been externally injected but there is a breakdown in the relation between contents of data frames having IDs different from each other, so there is a possibility that the firmware of this ECU has been unauthorizedly rewritten, and the MAC is unauthorized so it can be assumed that the probability that the secret key has not been leaked is high.

Also, in a case where the unauthorized activity determination results are normal but the intrusion determination results are abnormal and the MAC is valid, the abnormality handling table in this example indicates that the content of handling processing is to make a notification to the user to confirm the interface of connecting an external device, such as the diagnosis port 2400 or the like, and to perform key updating processing. There is no breakdown in the relation between contents of data frames having IDs different from each other, but an unauthorized message has been externally injected, and the MAC is normal, so there is a possibility that an attempt is being made to perform an attack by retransmitting a normal data frame, so this handling processing is useful processing to handle this. The key updating processing in this handling processing can prevent external injection of a data frame including a valid MAC. The abnormality handling table in this example also illustrates that in a case where the unauthorized activity determination results are normal, the intrusion determination results are abnormal, and the MAC is unauthorized, the content of handling processing is to make a notification to the user to confirm the interface of connecting an external device, such as the diagnosis port 2400 or the like. This is useful handling, since there is a possibility that an attempt is being made to perform an attack by retransmitting a normal data frame, but it can be assumed that the probability that the secret key has not been leaked is high. Notification to the user can be realized by, for example, effecting control so that a data frame of a predetermined ID is transmitted from the monitoring ECU 3100 to the bus 300, and upon the ECU 3200d receiving the data frame of the predetermined ID, a message decided beforehand is displayed on the instrument panel 240.

Also, in a case where the unauthorized activity determination results are abnormal and also the intrusion determination results are abnormal but the MAC is valid, the abnormality handling table in this example indicates that the content of handling processing is to make a notification to the user to confirm the interface of connecting an external device, such as the diagnosis port 2400 or the like, and also to transmit a frame notifying the ECUs that an abnormality is occurring (abnormality notification message). This handling processing is useful since the probability that an unauthorized message has been externally injected is high, the secret key also has been leaked, and the level of danger of the vehicle being controlled is thought to be high. The abnormality handling table in this example also illustrates that in a case where the unauthorized activity determination results are abnormal, the intrusion determination results are abnormal, and the MAC is unauthorized, the content of handling processing is to make a notification to the user to confirm the interface of connecting an external device, such as the diagnosis port 2400 or the like, and to transmit an abnormality detection message to the ECUs. This handling processing is useful handling, since there is a possibility that an attack frame has been externally injected and an ECU has been taken over, but the probability that the secret key has not been leaked is thought to be high. The ECUs of the onboard network system 12 can be configured so that in a case of having an abnormality notification message, security measures set beforehand (e.g., driving control where the vehicle is made to decelerate and stop or the like, limitation of automatic driving functions, etc.).

3.7 Configuration of ECU 3200a

Figure 29:
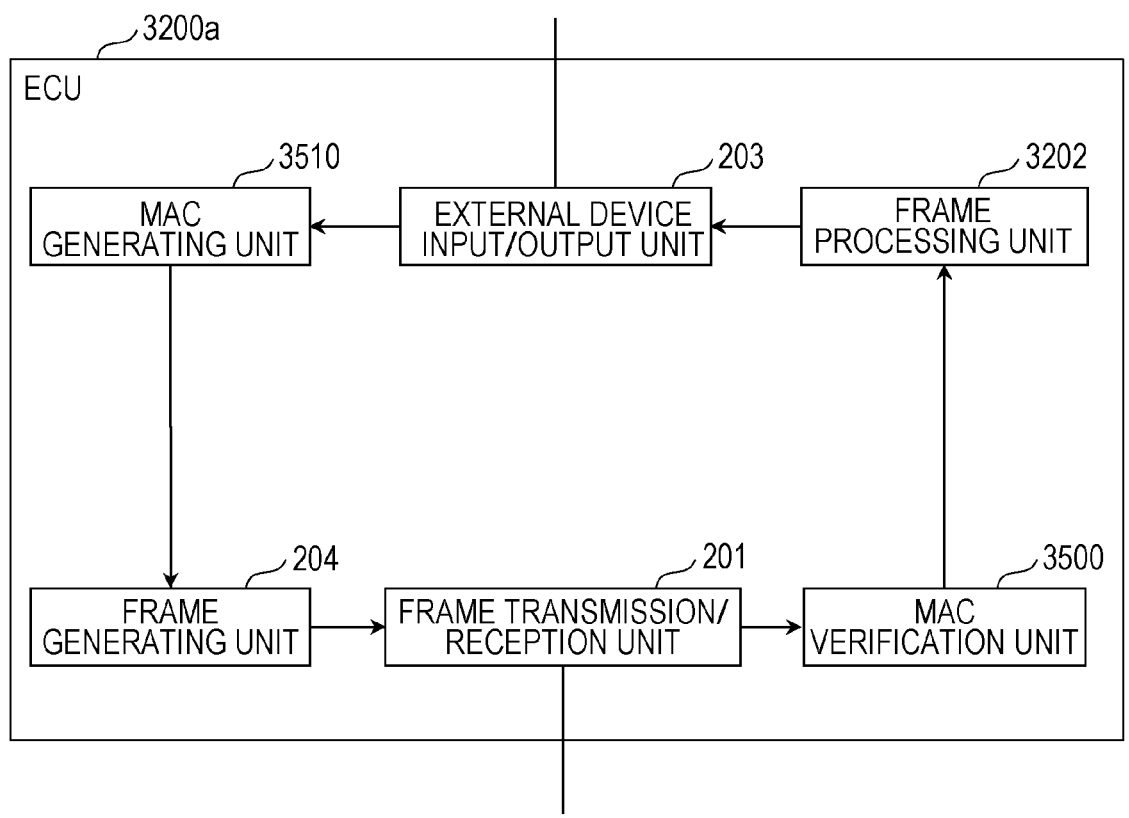
FIG. 29 is a configuration diagram of an ECU according to the third embodiment.

FIG. 29 is a configuration diagram of the ECU 3200a. The ECU 3200a is configured including the frame transmission/reception unit 201, a frame processing unit 3202, the device input/output unit 203, the frame generating unit 204, the MAC verification unit 3500, and the MAC generating unit 3510. These components are functional components, the functions thereof being realized by a communication circuit of the ECU 3200a, and a processor, digital circuit, or the like, executing control programs stored in memory. Note that the ECU 3200b, ECU 3200c, and ECU 3200d have generally the same configuration as the ECU 3200a. Components that are the same as those in the ECU 200a (see FIG. 9) described in the first embodiment are denoted in FIG. 29 by the same reference numerals as in FIG. 9, and description will be omitted here. The MAC verification unit 3500 and MAC generating unit 3501 are the same as the components in the monitoring ECU 3100 illustrated in FIG. 24, and accordingly description will be omitted here.

The frame processing unit 3202 interprets the contents of data frames that have been received by the frame transmission/reception unit 201 and have been found to have a valid MAC as the verification results at the MAC verification unit 3500. The frame processing unit 3202 of the ECU 3200d that has the same configuration as the ECU 3200a, for example, analyzes the vehicle speed (information of the speed sensor 210) and gearshift position state (information of the transmission 230), included in data frames transmitted from the ECU 3200a and ECU 3200c respectively, and notifies the device input/output unit 203 of the ECU 3200d regarding information necessary to update the display on the instrument panel 240 and so forth. In a case of having received a data frame that is a diagnosis message from the monitoring ECU 3100, for example, the frame processing unit 3202 also may transmit diagnosis information to the bus 300 via the frame transmission/reception unit 201 so that the monitoring ECU 3100 will be able to receive diagnosis information, by performing predetermined processing.

3.8 Operations of Monitoring ECU 3100

The monitoring ECU 3100 periodically performs unauthorized activity detection processing (unauthorized activity determination) and intrusion detection processing (intrusion determination) every 100 ms, for example, in the same way as the monitoring ECU 2100 illustrated in the second embodiment (see FIG. 19). Note however, that MAC verification results in data frames received from the bus 300 are also stored in the frame reception history. The monitoring ECU 3100 decides the contents of handling processing in accordance with the abnormality handling table, based on the unauthorized activity determination results, intrusion determination results, and MAC verification results. The monitoring ECU 3100 then executes handling processing of the decided contents.

3.9 First Example of Monitoring Operations of Bus 300 in Onboard Network System 12

Figure 30:
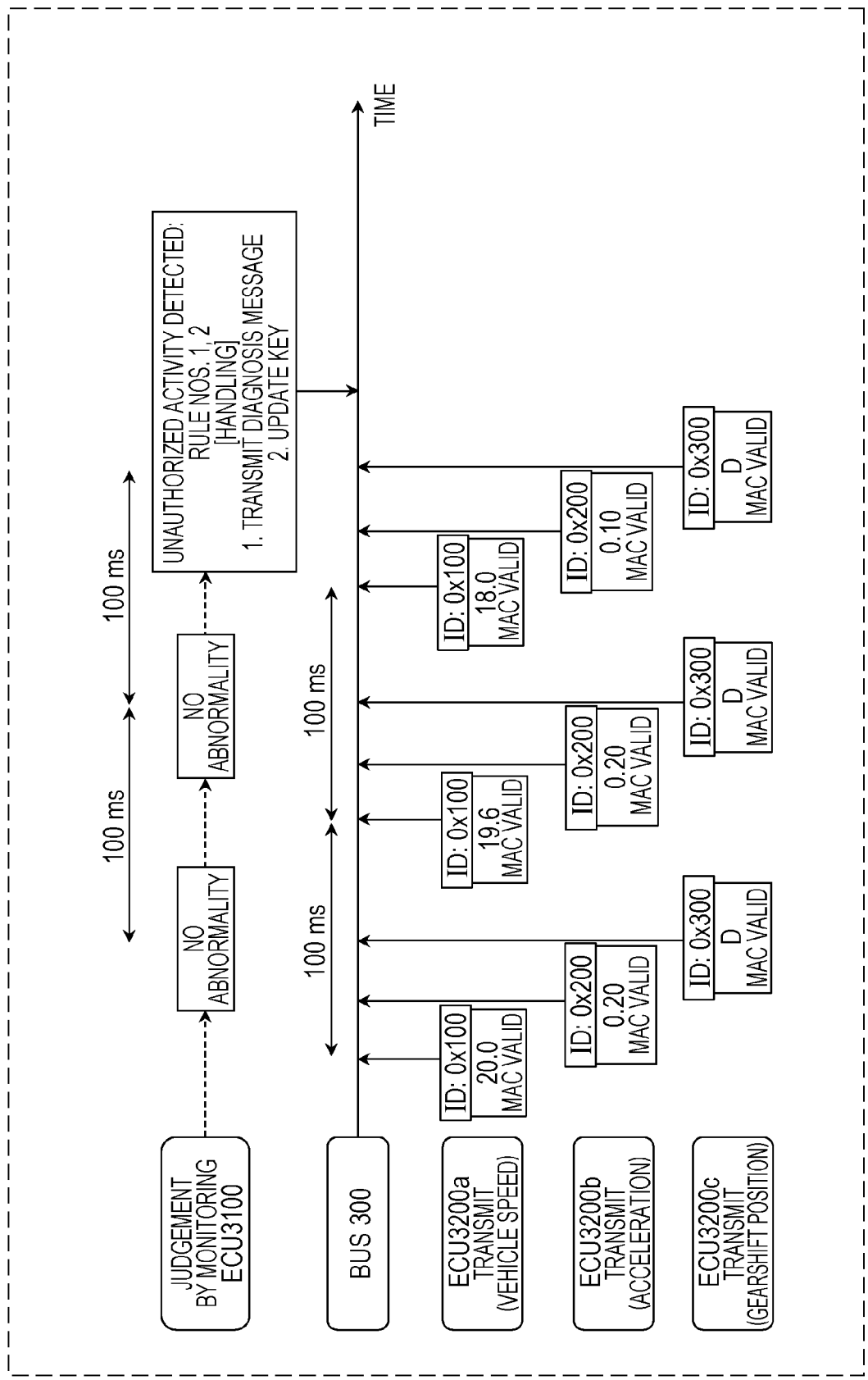
FIG. 30 is a diagram illustrating a first operation example of bus monitoring in the onboard network system according to the third embodiment.

FIG. 30 is a diagram illustrating a first example of operations of monitoring the bus 300 in the onboard network system 12. This example illustrates the way in which data frames of ID 0x100 (data frames indicating vehicle speed), data frames of ID 0)(200 (data frames indicating acceleration), and data frames of ID 0x300 (data frames indicating the state of the gearshift position) are periodically transmitted to the bus 300 from the ECU 3200a, ECU 3200b, and ECU 3200c, respectively. This example further illustrates an example where an attacker has unauthorizedly rewritten the firmware of the ECU 3200a, and the ECU 3200a has been tampering with the vehicle speed being notified from the speed sensor 210 from some point, and transmitting data frames indicating unauthorized vehicle speed to the bus 300. In this example, a situation is assumed where the secret key has been leaked, and MACs included in all data frames are valid.

The monitoring ECU 3100 periodically performs unauthorized activity determination (unauthorized activity detection processing) at 100 ms cycles immediately after having received a data frame of ID 0x300. If the timing of performing this unauthorized activity determination is at the end of each increment time (100 ms), no unauthorized activity is detected under any of the rule Nos. 1 through 3 that the unauthorized activity detection rule information stored in the unauthorized-activity-detection rule storing unit 170 indicates, with regard to the data frames received from the bus 300 in each of the first three unit times. Assuming that the integrated value of acceleration at the initial point in this example was 20.0 km/h, the integrated value of acceleration sequentially changes in the order of 20.072, 20.144, and 20.18 km/h, through the reception of the data frames indicating the acceleration at the first time through the third time. The difference (amount of change) between the vehicle speed indicated by the data frame for vehicle speed received the third time (18.0 km/h) and the integrated value based on acceleration indicated by acceleration data frames (20.18 km/h) has exceeded 1.0 km/h, so the monitoring ECU 3100 detects that the rule (condition) of rule No. 1 is not satisfied, and unauthorized activity is detected. Further, in a case where the state of the gearshift position indicated by the data frame received is "D" (drive), the monitoring ECU 3100 detects unauthorized activity regarding rule No. 2, since the amount in change of speed (the difference between the vehicle speed 18.0 km/h that the data frame for vehicle speed that has been received the third time and the vehicle speed 19.6 km/h indicated by the data frame received the previous time) has exceeded 1.0 km/h. Accordingly, the unauthorized activity determination results are abnormal, the intrusion determination results are normal, and the MAC verification results are valid, so the monitoring ECU 3100 decides that transmission of a diagnosis message to this ECU and key updating processing are the contents of handling processing, in accordance with the abnormality handling table, and carries out the handling processing. That is to say, the monitoring ECU 3100 identifies the transmission source of the data frames with the ID of 0x100, regarding which the degree of abnormality has been calculated 2 which is the highest due to not satisfying two rules (conditions), as being the ECU 3200a, by referencing the ECU information table stored in the ECU information table storing unit 190, and transmits a diagnosis message to the ECU 3200a. The monitoring ECU 3100 also performs notification prompting key updating processing to each of the ECUs (transmission of an updating message relating to updating of the secret key).

3.10 Second Example of Monitoring Operations of Bus 300 in Onboard Network System 12

Figure 31:
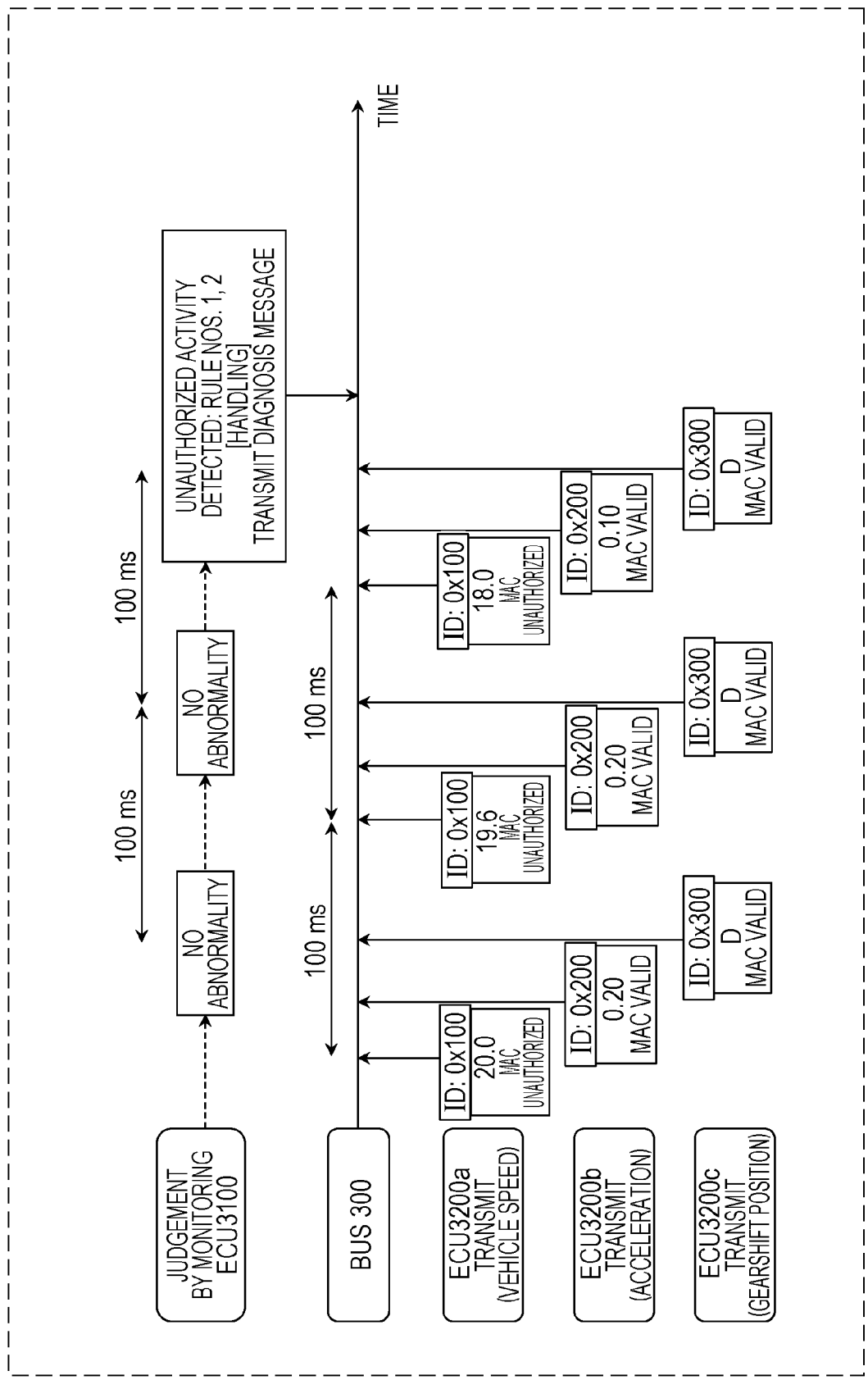
FIG. 31 is a diagram illustrating a second operation example of bus monitoring in the onboard network system according to the third embodiment.

FIG. 31 is a diagram illustrating a second example of operations of monitoring the bus 300 in the onboard network system 12. The second operation example in FIG. 31 illustrates an example of a situation that is similar to the first operation example, but the secret key has not been leaked, and the MAC included in data frames transmitted by the ECU 3200a are unauthorized. In this example, the unauthorized activity determination results are abnormal, the intrusion determination results are normal, and the MAC verification results are unauthorized, so the monitoring ECU 3100 decides that transmission of a diagnosis message to this ECU (i.e., the ECU 3200a) is the contents of handling processing, in accordance with the abnormality handling table, and carries out the handling processing.

3.11 Advantages of Third Embodiment

In the onboard network system 12 according to the third embodiment, the monitoring ECU 3100 decides contents of handling processing, based on combination of unauthorized activity determination to detect unauthorized activity based on the relation between data frames having multiple IDs that are different from each other, intrusion determination to detect intrusion based on conditions set for each ID regarding data frames of a single ID, and verification results of MAC validity, and executes the handling. Accordingly, even in a case where the firmware of an ECU is unauthorizedly rewritten by an attacker or an unauthorized program is executed in an ECU, and a data frame of unauthorized content is transmitted at a valid timing as a result, transmission of the unauthorized data frame can be detected from the breakdown in the relation of contents between data frames with different IDs. For example, even if an attacker takes over a certain ECU and transmits an unauthorized data frame, the unauthorized activity is detected based on the relation as to data frames transmitted by other ECUs, so it becomes more difficult for an attacker to attack without the unauthorized activity being detected. Further, cases where an attacker externally injects an unauthorized data frame can also be appropriately detected, and appropriate handling corresponding to the state of attack can be realized in accordance with the combination of the unauthorized activity determination results, intrusion determination results, and MAC verification results.

Other Embodiments

The first through third embodiments have been described above as examples of technology relating to the present disclosure. However, technology relating to the present disclosure is not restricted to this, and is applicable to embodiments where modifications, substitutions, addition, omission, and so forth have been made as appropriate. For example, the following modifications are also included in an embodiment of the present disclosure.

(1) Although description has been made in the above embodiments regarding a monitoring ECU that performs monitoring of the bus 300 and handling in accordance with monitoring results, the monitoring ECU does not need to be an ECU dedicated to monitoring, as long as it is an ECU connected to the bus in the onboard network system, and may also have functions different from monitoring and processing. Also, one or more components of the monitoring ECU may be relocated to another ECU. For example, a configuration for unauthorized activity determination (unauthorized activity determination unit, etc.), a configuration for intrusion determination (intrusion determination unit, etc.), and so forth, of the monitoring ECU, may be included in another ECU. For example, a gateway ECU that performs transfer of data frames among busses in a case where the onboard network is configured of multiple busses may have the unauthorized activity determination unit, and a key managing master ECU that manages secret keys may have the unauthorized activity determination unit, intrusion determination unit, MAC verification unit, and so forth.

(2) Although data frames in the CAN protocol are described in a standard ID format in the above embodiments, this may be the extended ID format, and IDs that are identifiers of data frames may be extended IDs in the extended ID format, or the like.

(3) Although an example has been described in the above embodiments where the monitoring ECU periodically performs unauthorized activity detection processing (unauthorized activity determination) and intrusion detection processing (intrusion determination) at 100 ms cycles for example, the cycles are optional, and do not necessarily have to be performed periodically. For example, the monitoring ECU may perform unauthorized activity determination or intrusion determination each time a data frame is received. Also, unauthorized activity determination and intrusion determination may each be performed at different timings.

(4) The frame reception history storing unit described in the above embodiments may store several times worth of reception history as the frame reception history. The frame reception history storing unit may also store information serving as reception history of a time where reception has actually not been performed as frame reception history, by data interpolation based on information of data frames that have actually been received.

(5) Although an example has been described in the above embodiments where the frame reception history storing unit stores the reception times, verification results of the validity of MACs, values indicating the contents of data fields, as frame reception history, other information may be stored. It is sufficient for the frame reception history storing unit to store optional information necessary for unauthorized activity detection processing (unauthorized activity determination) or intrusion detection processing (intrusion determination). In a case where contents of data fields represent multiple values, the values may be stored in a distinguished manner, and the monitoring ECU may perform unauthorized activity determination or intrusion determination using unauthorized activity detection rule information or intrusion detection rule information indicating conditions relating to the values.

(6) Although an example has been described in the above embodiments regarding conditions relating to the relation between speed (vehicle speed) and acceleration, conditions relating to the gearshift position state and amount of change in vehicle speed, and conditions relating to the gearshift position state and amount of change in acceleration, as rules (conditions) indicated by the unauthorized activity detection rule information, this is only one example. Anything may be used as long as a certain relation is maintained in a normal state between data indicated by multiple data frames having IDs different from each other. Particularly, a relation between data measured by sensors is useful. Relation of reception time of data frames and so forth, such as relation of times at which multiple data frames transmitted at irregular timings flow over the bus, may be added as conditions for unauthorized activity determination, not just the relation between data values indicated by data fields. The unauthorized activity detection rule information may, for example, indicate a relational expression $y=f(x)$ indicating the relation between a value y indicated by content of a data field of a data frame having one ID and a value x indicated by content of a data field of a data frame having another ID, being within a certain error range, as a condition.

(7) Although an example has been described in the above embodiments where conditions relating to the relation between an integrated value of acceleration that is identified based on the content of data fields of multiple data frames of the ID 0x200, and vehicle speed indicated by the content of the data field of one data frame of ID 0x100 (conditions relating to a relation between objective variable and explanatory variable) and so forth, are rules (conditions) that the unauthorized activity detection rule information indicates, this relation is only an example. The following is a description of an example of a relation, by way of an example where the unauthorized activity detection rule information indicates conditions relating to the relation of contents in data fields of a first type of frame that is a data frame having a certain ID (first identifier), and a second type of data frame having an ID that is different from the first identifier (second identifier). Conditions indicated by the unauthorized activity detection rule information stipulate, for example, a relation between a value identified based on the content of the data fields in one or more (or multiple) first frames, and the content of data fields in one or more second type of frame. The value identified based on the content of the data field in the first type of frame may be a numerical value, or may be a value indicating level, such as large, medium, smaller, or the like, or may be a text string or the like distinguishing states. For example, conditions indicated by the unauthorized activity detection rule information may be stipulating the relation between content of data fields of one or more first type of frames and content of data fields of one or more second type of frames, by a relational expression using Pearson's product-moment correlation coefficient, maximum information coefficient, or canonical correlation coefficient. For example, a correlation coefficient (Pearson's product-moment correlation coefficient) may be obtained as an indicator representing intensity of linear relation may be obtained as to time-series data of vehicle speed and acceleration, thereby stipulating conditions relating to the height of the correlation coefficient. Conditions may be stipulated regarding the height of a maximum information coefficient, as an indicator that can express non-linear relations as well. Conditions may be stipulated regarding the height of a canonical correlation coefficient, as an index representing the correlation among groups of variables where a great number of variables make up two groups of variables in multivariate data. Note that besides obtaining correlation coefficients and so forth regarding time-series data of vehicle speed and acceleration, correlation coefficients and so forth regarding time-series data of vehicle speed and tire revolutions may be obtained to stipulate conditions, and a relational expression regarding vehicle speed and tire revolutions may be obtained to stipulate conditions. Other examples of quantities that are the object of stipulating conditions in the unauthorized activity detection rule information based on correlation coefficients, relational expressions, or the like, include a set of acceleration and the amount of change in vehicle speed, a set of displacement of the accelerator pedal and the amount of change in vehicle speed, a set of displacement of the brake pedal and the amount of change in vehicle speed, a set of steering angle and yaw rate, and so forth.

(8) Description has been made in the above-described embodiment that the unauthorized activity determination unit determines whether or not conditions indicated by the unauthorized activity detection rule information are satisfied, based on information regarding data frames received from the bus (frame reception history). This determination (unauthorized activity determination) may be realized by any specific method, in accordance with conditions indicated by the unauthorized activity detection rule information. This unauthorized activity determination is realized by, for example, executing predetermined computation processing to distinguish whether or not the condition that the unauthorized activity detection rule information is satisfied, using a first value based on content of the data field in the first type of frame that has been received from the bus during one or multiple unit times, and a second value based on content of the data field in the second type of frame that has been received from the bus during, out of the one or multiple unit times, a last one or more unit times. The predetermined computation processing here may be any computation processing as long as it is computation processing to distinguish whether or not the condition indicated by the unauthorized activity detection rule information is satisfied, using at least the first value and second value. The predetermined computation processing may be processing for distinguishing whether or not the condition indicated by the unauthorized activity detection rule information is satisfied, by whether or not the first value falls within a range of quantitative variable values calculated using the second value as qualitative variable value, based on a standard where quantitative variable values are stipulated for each qualitative variable value, for example. The first value may be a value relating to a physical amount measured by a sensor (vehicle speed, amount of change in vehicle speed, etc.), for example. The second value may be a flag value indicating a state of the vehicle (a flag value indicating the state of the gearshift position, a flag value indicating the operating state of lane-keeping functions, a flag value indicating the operating state of automatic parking support functions, a flag value indicating the operating state of cruise control functions, etc.). The predetermined computation processing may be processing for distinguishing whether or not the condition indicated by the unauthorized activity detection rule information is satisfied, according to whether or not the second value falls within a range of objective variable values calculating using the first value as an explanatory variable value, based on a relational expression indicating a relation between an objective variable and an explanatory variable, for example. The first value and second value are, for example, values relating to physical phenomena having a causal relation.

(9) Although the embodiments describe above use the relation between contents of two types (two IDs) of data frames for the condition that the unauthorized activity detection rule information indicates, this is not restricted to two types, and the relation between contents of three or more types (three or more IDs) of data frames may be used. For example, the unauthorized activity detection rule information may indicate a condition where the results of predetermined computation (e.g., arithmetic computation, logical computation, etc.), based on values indicated by the contents of data frames of three or more different predetermined IDs received in the same unit time, exceed a predetermined threshold value, or the like.

(10) An example has been described in the above embodiments where the ECU transmitting the data frame of the ID of which the degree of abnormality calculated by the unauthorized activity determination unit is the highest is identified, and handling processing is executed such as transmitting a diagnosis message to that ECU. However, a threshold value may be provided regarding the degree of abnormality, with an ECU transmitting a data frame of an ID of which the degree of abnormality is at the threshold value or higher being identified, and handling processing being executed such as transmitting a diagnosis message to this ECU.

(11) Although an example where the unauthorized activity determination unit of the monitoring ECU calculates the degree of abnormality and adds this to the unauthorized activity determination results has been described above, the degree of abnormality does not necessarily have to be calculated. In a case of not calculating the degree of abnormality, the monitoring ECU may transmit diagnosis message of each of the transmission source ECUs of multiple data frames determined to be unauthorized. Note that using degree of abnormality calculation to narrow down the object to which a diagnosis message is to be transmitted, out of the transmission source ECUs of each of multiple data frames that have been determined to be unauthorized, due to not satisfying conditions indicated by the unauthorized activity detection rule information, is useful in suppressing increased amount of bus traffic. In a case where the unauthorized activity detection rule information indicates a first condition (e.g., condition of rule No. 1 illustrated in FIG. 6) regarding a relation of the contents of data fields in a first type of frame that is a data frame having a certain ID (a first identifier, e.g., an ID 0x100) and a second type of frame that is a data frame having an ID that differs from the first identifier (a second identifier, e.g., an ID 0x200), and further indicates a second condition (e.g., condition of rule No. 2 illustrated in FIG. 6) regarding a relation of the contents of data fields in the first type of frame and a third type of frame that is a data frame having an ID that differs from the first identifier and the second identifier (a third identifier, e.g., an ID 0x300), the degree of abnormality can be calculated in the unauthorized activity determination relating to transmission of the first type of frame, in accordance with the number of conditions out of the first condition and second condition determined to not be satisfied. In a case where the calculated degree of abnormality satisfies a predetermined abnormality condition (e.g., higher than a threshold value, or higher than a degree of abnormality relating to transmission of another type of frame that has been calculated separately, etc.), transmitting a predetermined frame (diagnosis message, etc.) to be receivable by the ECU transmitting the first type of frame can realize suppression of increase in the amount of bus traffic.

(12) Although an example where the monitoring ECU stores the unauthorized activity determination results in the format of a table where IDs are correlated has been illustrated in the above embodiments, it is sufficient for information indicating some sort of determination results (e.g., information indicating a set of rule No. and determination results according to a condition relating to that rule No., etc.) to be stored in a storage medium such as memory, a hard disk, or the like, that the monitoring ECU has, when the unauthorized activity determination unit determines whether or not a set of frames received from the bus satisfy a condition indicated in the unauthorized activity detection rule information, and information may be stored in any format. When the unauthorized activity determination unit performs unauthorized activity determination, some sort of information indicating the determination results thereof is stored in the storage medium.

(13) Although conditions regarding reception interval and amount of change of data relating to data frames of a single ID have been exemplified in the above embodiments as conditions that the intrusion detection rule information indicates, this is only an example, and other conditions may be used. For example, conditions relating to reception frequency (the number of data frames having that single ID that are received in a certain time, etc.) may be used. Conditions that a normal data frame should satisfy are stipulated for conditions indicated by the unauthorized activity detection rule information. It is useful for the conditions to be stipulated such that in a case where a data frame is externally injected for an attack, and both the unauthorized data frame and a normal data frame are flowing over the bus, the conditions are not satisfied any longer.

(14) Although an example has been illustrated in the above embodiments where the intrusion determination results storing unit stores intrusion determination results distinguishing whether normal or abnormal (intrusion detected) for each ID, the intrusion determination results are not restricted to this. For example, the number of normal determinations or the number of abnormal determinations within a certain time may be used as the intrusion determination results, without distinguishing IDs. It is sufficient for the intrusion determination results to be information relating to the results of intrusion determination based on the unauthorized activity detection rule information, and accordingly, the monitoring ECU can decode handling processing to handle an abnormality, based on a combination of intrusion determination results based on intrusion detection rule information and unauthorized activity determination results based on unauthorized activity detection rule information.

(15) Although an example of using AES-CMAC for MAC generation has been described in the above embodiments, the method of generating MACs is not restricted to this. For example, block cipher other than AES may be used, or Hash-based Message Authentication Code (HMAC) or the like may be used.

(16) Although the ID and data field value are used as the input for the AES encryption unit (e.g., encryption function) to generate MACs, input values are not restricted to this. For example, just the value of the data field may be used as input, or the DLC may be included in the input. Also, as a measure to counter replay attacks, time information or the like may be included in the input besides the counter value.

(17) In the above embodiments, transmission of a diagnosis message to the ECU, updating of keys for authentication (key updating processing), notification to prompt the user to confirm the diagnosis port or the like, transmission of an abnormality notification message to the ECUs, and so forth, have been exemplified as handling in accordance with unauthorized activity determination results or handling in accordance with a combination of unauthorized activity determination results and intrusion determination results or the like (contents of handling processing). However, the contents of handling processing may be other than those described above. For example, handling processing may be transmitting a diagnosis frame to be receivable by a particular electronic control unit connected to the bus, confirming validity of a particular electronic control unit connected to the bus by challenge-response authentication, performing notification to prompt confirmation of a diagnosis port on the bus, performing notification to prompt the driver of the vehicle, in which the onboard network system is installed, to stop or to drive slowly, performing notification to prompt the driver of the vehicle, in which the onboard network system is installed, to go to a dealer, performing notification to the driver of the vehicle, in which the onboard network system is installed, that an unauthorized state is occurring, performing notification to an electronic control unit connected to the bus that a data frame having a particular identifier (ID) is unauthorized, performing notification to a server (e.g., a server or the like operated by the vehicle manufacturer or the like) outside of the vehicle, in which the onboard network system is installed, that an unauthorized data frame is being transmitted, performing notification to the vehicle or roadside device near the vehicle, in which the onboard network system is installed, that an unauthorized state is occurring, switching the onboard network system to a fail-safe mode that has been set beforehand, which can include isolating the diagnosis port, limiting automatic control functions, and so forth, and recording as a log that an unauthorized state is occurring. The monitoring ECU may execute any one or more of the above-described handling processing in a case where the degree of abnormality calculated by the unauthorized activity determination unit satisfies a predetermined abnormality condition (e.g., a case of exceeding a threshold value or the like). The monitoring ECU may also change the contents of handling processing to reflect the level of the degree of abnormality that the unauthorized activity determination unit has calculated.

(18) In the above embodiments, the monitoring ECU has been described as deciding the contents of handling processing in accordance with a combination of the results (unauthorized activity determination results) of determination by the unauthorized activity determination unit (unauthorized activity determination), the results (intrusion determination results) of determination by the intrusion determination unit (intrusion determination), and the verification results of the validity of an identifier (MAC) by the MAC verification unit, and under certain conditions (e.g., in a case where the unauthorized activity determination results or intrusion determination results are abnormal and the MAC is valid), decide and execute key updating processing, relating to updating of authentication keys, as the handling processing. Further, after having executed the key updating processing, the monitoring ECU may perform unauthorized activity determination, intrusion determination, and MAC verification, on data frames received from the bus, and perform handling processing different from the key updating processing (notifying the user of a dangerous state, notifying a server, etc.) in a case where the combination of the unauthorized activity determination results and intrusion determination results and verification results satisfy certain conditions (e.g., a case where the MAC is valid, but a state is continuing where the unauthorized activity determination results or intrusion determination results are still abnormal, or the like). This handling processing different from the key updating processing can be useful in cases where updating keys did not effectively work, or the like.

(19) Although an example has been described in the above embodiments where the unauthorized-activity-detection rule storing unit stores unauthorized activity detection rule information indicating conditions regarding a relation between data frames of IDs that are different from each other, the unauthorized activity detection rule information may be sequentially updated using results learned by having monitored and analyzed data frames flowing over the bus. Information regarding contents of data frames of the IDs flowing over the bus may be collected and statistical processing, multivariate analysis, or the like may be performed to obtain correlation coefficients between contents of data frames having multiple IDs that are different from each other, and relations among contents of data frames that exhibit values of correlation coefficients at or above a predetermined threshold value may be included in the unauthorized activity detection rule information as new conditions to be satisfied. Also, relations among explanatory variables and objective variables, obtained by regression analysis, multi-regression analysis, discriminatory analysis, or the like, for estimation of relational expressions for explanatory variables and objective variables, may be included in the unauthorized activity detection rule information as conditions. That is to say, the monitoring ECU may identify relations of contents in data frames among data frames that have IDs that are different from each other by multivariate analysis based on a set of data frames received from the bus, and generate or update the unauthorized activity detection rule information so as to indicate conditions representing the identified relation.

(20) Although description has been made in the above embodiments that the unauthorized activity determination unit adds the count of unauthorized MACs to the unauthorized activity determination results based on the MAC verification results, and the intrusion determination unit adds the MAC validity to the intrusion determination results, information based on Mac verification results does not have to be included in the unauthorized activity determination results and intrusion determination results. The abnormality handling unit can obtain MAC verification results from the frame reception history that the frame reception history storing unit stores, for example. Note that in a case where the unauthorized activity determination unit is to identify unauthorized activity determination results taking MAC verification results into consideration, the unauthorized activity determination results can be sued at the time of the abnormality handling unit performing various types of handling.

(21) Although an example has been described in the above embodiments where, in a case that the unauthorized activity determination results or intrusion determination results are abnormal and the MAC is valid in the MAC verification results, the monitoring ECU executes key updating processing as handling processing, in light of the possibility that the key may have been leaked, whether or not to use key updating processing as the content of the handling processing may be distinguished based on the number of times that the MAC has been valid in the verification results. For example, in a case where the unauthorized activity determination results or intrusion determination results are abnormal, and MAC verification has been successful for a predetermined count N, the probability that the key has been leaked is high, so the monitoring ECU may execute key updating processing. Note that it is useful to set this count N to a count where the probability of the MAC being determined to be valid in N verifications is sufficiently low, in a case where data frames with random values are added as MACs have been sequentially transmitted, for example.

(22) An example has been described in the above embodiments where the monitoring ECU decides (selects) and executes the contents of handling processing in accordance with a combination of unauthorized activity determination results, intrusion determination results, and MAC verification results or the like. A combination of unauthorized activity determination results, intrusion determination results, and MAC verification results enables classifying unauthorized states (abnormality of data frames of a particular ID, data frames with a high degree of abnormality, an ECU regarding which the probability of being abnormal is high, abnormality in the relation between data frames of different IDs, etc.) into multiple classifications, and performing appropriate handling for each of these. The monitoring ECU may decide handling processing using one or more of the unauthorized activity determination results, intrusion determination results, and MAC verification results, and may further distinguish the scope of attack and decide appropriate handling procedures using this distinction as well. For example, in a case of having detected that an unauthorized state has occurred, the monitoring ECU may identify a sub-network that has transmitted a data frame related to the occurrence of the unauthorized state, the ECU that has transmitted this frame, and the ID of the data frame, and record that which has been identified in the identifying in a storage medium such as memory or the like. Using this identified sub-network, ECU, ID, or the like along with the unauthorized activity determination results, intrusion determination results, and MAC verification results, enables the unauthorized state (abnormality) to be comprehended in further detail (e.g., comprehension of abnormalities occurring in a group of data frames relating to a particular function, such as driving support functions or the like, based on the ID), and collecting information relating to such an unauthorized state can be useful in identifying the purpose of the attack, the scope of the attack, and so forth.

(23) Although an example has been described in the above embodiments where the transmission source ECUs of data frames having two IDs that differ from each other that relate to conditions indicated by the unauthorized activity detection rule information are different ECUs (see FIG. 12, etc.), this is only one example. There are cases where a single ECU transmits data frames having multiple IDs that differ from each other, so the unauthorized activity detection rule information may indicate conditions regarding relations between contest of data frames having multiple IDs that are transmitted by the same ECU. Accordingly, occurrence of an unauthorized state can be detected in a case where there is breakdown in the relation between a data frame transmitted by an ECU that has been tampered with by an attacker using an unauthorized program for example, and a data frame having another ID that is transmitted from the same ECU.

(24) An onboard network that performs communication in accordance with the CAN protocol has been illustrated in the above-described embodiments. This CAN protocol is to be understood to have a broad meaning, encompassing derivative protocols such as CAN with Flexible Data Rate (CANFD) and so forth. Also, communication protocols other than the CAN protocol may be used in the onboard network, such as Ethernet (a registered trademark), Local Interconnect Network (LIN), Media Oriented Systems Transport (MOST, a registered trademark), FlexRay (a registered trademark), or the like, for example. Further, sub-network using these protocols may be combined to configure the onboard network.

(25) The order of execution of the procedures in the various types of processing illustrated in the above-described embodiments (e.g., the procedures illustrated in FIGS. 11 and 19) is not necessarily restricted to the above-described order. The order of execution may be interchanged, multiple procedures may be performed in parallel, part of the procedures may be omitted, and so forth, within a scope of not departing from the essence of the disclosure.

(26) Although the monitoring ECU and other ECUs in the above embodiments have been described as being devices including digital circuits such as processors, memory, and so forth, analog circuits, communication circuits, and the like, other hardware components may be included, such as hard disk devices, displays, keyboards, mice, and so forth. Also, the functions of the devices (monitoring ECU, etc.) illustrated in the above-described embodiments may be realized by dedicated hardware (digital circuits, etc.) instead of realizing the functions by software by control programs stored in memory being executed by a processor.

(27) Part or all of the components configuring the device in the above-described embodiments may be configured as a single system LSI (Large Scale Integration). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip. While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. An FPGA (Field Programmable Gate Array) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(28) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(29) One aspect of the present disclosure may be an unauthorized activity detection method including all or part of the processing procedures illustrated in FIG. 11, FIG. 19, and so forth. For example, the unauthorized activity detection method is an unauthorized activity detection method for detecting that an unauthorized state has occurred in an onboard network system having a plurality of electronic control units that perform communication via a bus. The method includes determining, using unauthorized activity detection rule information indicating a first condition that is a condition regarding a relation in content between a frame having a first identifier and a frame having an identifier that differs from the first identifier, whether or not a set of frames received from the bus satisfies the first condition, and detecting that an unauthorized state has occurred in a case where the first condition is not satisfied. For example, the multiple electronic control units may exchange data frames following the CAN protocol via the bus, the unauthorized activity detection rule information may indicates the first condition in a relation of content of data fields between a first type of frame that is a data frame having an ID (first identifier) and second type of frame that is a data frame having an ID (second identifier) that is different from the first identifier, and the unauthorized activity detection method may include a receiving step of a monitoring ECU connected to the bus sequentially receiving data frames transmitted onto the bus, and an unauthorized activity determining step of determining whether the first type of frame and the second type of frame received in the receiving step satisfy the first condition that the unauthorized activity detection rule information indicates (e.g., steps S1102, S2102). Determination may be made in the unauthorized activity determining step regarding whether or not a second condition regarding to a relation between contents of the first type of frame and a third type of frame (a data frame having an ID that is different from the first identifier and the second identifier) is satisfied, and the unauthorized activity detection method may further include a degree-of-abnormality calculating step of calculating a degree of abnormality relating to transmission of the first type of frame, in accordance with a count of conditions determined in the unauthorized activity determining step to be satisfied, out of the first condition and the second condition (e.g., step S1103). The unauthorized activity detection method may further include a transmitting step of the monitoring ECU transmitting a predetermined frame (e.g., a diagnosis frame) to be receivable by an electronic control unit transmitting the first type of frame, in a case where the degree of abnormality calculated in the degree-of-abnormality calculating step satisfies a predetermined abnormality condition (e.g., steps S1104 through S1106). The unauthorized activity detection method may further include an intrusion determining step of determining, using intrusion detection rule information indicating a condition regarding a data frame set for each ID (identifier) of data frames, whether or not a data frame received from the bus in the receiving step satisfies this condition indicated by this intrusion detection rule information (e.g., step S2103), and a handling step of deciding content of handling processing in accordance with a combination of determination results in the unauthorized activity determination step and determination results in the intrusion determination step, and executing handling processing in accordance with the decision (e.g., steps S2104 and S2105). The unauthorized activity detection method may further include a verifying step of verifying validity of an authenticator for authentication in a data frame received from the bus. At least part of the unauthorized activity determination step, the degree-of-abnormality calculating step, and intrusion determination step may be executed at a device other than the monitoring ECU (e.g., a server outside of the vehicle with which the monitoring ECU can communicate, another ECU, or the like). An aspect of the present disclosure may be a computer program which realizes processing relating to this unauthorized activity detection method by a computer, or may be digital signals made up of the computer program. An aspect of the present disclosure may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums. An aspect of the present disclosure may be an arrangement where the computer program or the digital signals are transmitted over an electric communication line, wireless or cable communication line, a network of which the Internet is representative, data broadcasting, or the like. Also, an aspect of the present disclosure may be a computer system having a microprocessor and memory, where the memory records the computer program, and the microprocessor operates according to the computer program. The program or the digital signals may be recorded in the recording medium and transported, or the program or the digital signals may be transported over the network or the like, and thereby be executed by another computer system that is independent.

(30) Forms realized by optionally combining the components and functions described in the above embodiments and the above modifications are also included in the scope of the present disclosure.

The present disclosure is usable to detect and appropriately handle attacks on an onboard network.

What is claimed is:

1. An unauthorized activity detection method for detecting an occurrence of an unauthorized state in an onboard network system having a plurality of electronic control units that perform communication via a bus, the onboard network system including a monitoring electronic control unit connected to the bus, the unauthorized activity detection method comprising:

receiving sequentially, by the monitoring electronic control unit, data frames transmitted onto the bus;

storing, by the monitoring electronic control unit, a frame reception history, which include information relating to contents of the data frames that the monitoring electronic control unit has successively received;

first determining, by the monitoring electronic control unit and using unauthorized activity detection rule information indicating a first condition, whether or not a set of data frames received from the bus satisfies the first condition by referencing the frame reception history, the first condition being a condition regarding a relation in content between a first data frame having a first identifier and a second data frame having a second identifier that differs from the first identifier; and detecting, by the monitoring electronic control unit, the occurrence of the unauthorized state in a case where the first condition is not satisfied, wherein content of the first data frame includes a value indicating a first operational status of a vehicle, in which the onboard network system is installed, and content of the second data frame includes a value indicating a second operational status of the vehicle, wherein the plurality of electronic control units exchange the data frames following a Controller Area Network protocol via the bus, wherein the unauthorized activity detection rule information indicates the first condition in relation of content of data fields between a first type of frame and second type of frame, the first type of frame being a data frame having the first identifier and the second type of frame having the second identifier different from the first identifier, wherein, in the first determining, a determination is made regarding whether the first type of frame and the second type of frame satisfy the first condition indicated by the unauthorized activity detection rule information;

wherein the unauthorized activity detection method further comprises:

calculating, by the monitoring electronic control unit, a degree of abnormality relating to a transmission of the first type of frame, in accordance with
a count of conditions determined as not being satisfied in the first determining, the count of conditions being out of the first condition and a second condition further indicated by the unauthorized activity detection rule information to be a condition regarding relation of content of data frames between the first type of frame, and
a third type of frame that is a data frame having a third identifier that is different from the first identifier and the second identifier; and transmitting, by the monitoring electronic control unit, a predetermined data frame to be receivable by an electronic control unit transmitting the first type of frame, in a case where the degree of abnormality calculated in the calculating satisfies a predetermined abnormality condition, and wherein, in the first determining, determination is further made regarding whether or not the first type of frame and the third type of frame received satisfy the second condition indicated by the unauthorized activity detection rule information.

2. The unauthorized activity detection method according to claim 1, wherein the unauthorized activity detection rule information stipulates, as the first condition, a relation between a value identified based on content of a data field in one or more of the first type of frame, and content of a data field in one or more of the second type of frame, wherein, in the first determining, a predetermined computation is executed to distinguish whether or not the first condition is satisfied, and wherein the first determining is performed using a first value based on content of the data field in the first type of frame received during one or a plurality of units of time, and a second value based on content of the data field in the second type of frame received during, out of the one or the plurality of units of time, a last unit of time.

3. The unauthorized activity detection method according to claim 2, wherein the predetermined computation includes processing to distinguish whether or not the first condition is satisfied, according to whether or not the first value falls within a range of quantitative variable values calculated using the second value as a qualitative variable value, based on a standard where a range of values of a quantitative variable is stipulated for each qualitative variable value.

4. The unauthorized activity detection method according to claim 2, wherein the predetermined computation includes processing to distinguish whether or not the first condition is satisfied, according to whether or not the second value falls within a range of objective variable values calculated using the first value as an explanatory variable value, based on a relational expression indicating a relation between an objective variable and the explanatory variable.

5. The unauthorized activity detection method according to claim 1, wherein the unauthorized activity detection rule information stipulates, as the first condition, a relation between a value identified based on content of data fields in a plurality of first type of frames, and content of data fields in one or more of the second type of frames, wherein, in the first determining, a predetermined computation is executed to distinguish whether or not the first condition is satisfied, and wherein the first determining is performed using a first value based on content of the data field in the first type of frame received during a plurality of units of time, and a second value based on content of the data field in the second type of frame that has been received during, out of the plurality of unit times, a last unit of time.

6. The unauthorized activity detection method according to claim 1,
wherein the unauthorized activity detection rule information stipulates, as the first condition, a relation between content of a data field in one or more of the first type of frames and content of a data field in one or more of the second type of frames, by a relational expression using a Pearson's product-moment correlation coefficient, a maximum information coefficient, or a canonical correlation coefficient.

7. The unauthorized activity detection method according to claim 1, further comprising:
second determining, by the monitoring electronic control unit using intrusion detection rule information indicating a second condition regarding a data frame set for each identifier of data frames, of whether or not a data frame received from the bus in the receiving satisfies the second condition indicated by the intrusion detection rule information;
deciding, by the monitoring electronic control unit, content of a handling processing in accordance with a combination of determination results in the first determining and determination results in the second determining; and
executing, by the monitoring electronic control unit, the handling processing in accordance with the deciding,
wherein the second condition regarding a data frame of a target identifier, that the intrusion detection rule information indicates, includes a condition regarding one of
a reception interval between data frames having the target identifier,
a count of data frames having the target identifier are received in a certain time, and
an amount of change indicating a difference in values extracted from data fields among data frames having the target identifier.

8. The unauthorized activity detection method according to claim 7, further comprising:
verifying, by the monitoring electronic control unit, validity of an authenticator for authentication in a data frame received from the bus,
wherein, in the deciding, a key updating processing, relating to updating of a key for authentication, is decided as the content of the handling processing under a third condition, the third condition being predetermined.

9. The unauthorized activity detection method according to claim 8, further comprising:
executing, in the handling processing, the first determining, the second determining, and the verifying, for a data frame received in the receiving after having executed the key updating processing; and
executing, by the monitoring electronic control unit, in a case where a combination of the determination results in the first determining, the determination results in the second determining, and the verification results in the verifying satisfy a fourth condition, another handling processing that is different from the key updating processing.

10. The unauthorized activity detection method according to claim 1, further comprising:
identifying, in a case where an occurrence of the unauthorized state has been detected, one of a sub-network that has transmitted a data frame related to the occurrence of the unauthorized state,
an electronic control unit that has transmitted the data frame related to the occurrence of the unauthorized state, and
an identifier of the data frame related to the occurrence of the unauthorized state.

11. The unauthorized activity detection method according to claim 1, further comprising:
executing, by the monitoring electronic control unit, a handling processing in a case of detecting an occurrence of the unauthorized state,
wherein the handling processing includes one of
transmitting a diagnosis data frame to be receivable by a particular electronic control unit connected to the bus,
confirming validity of the particular electronic control unit connected to the bus by performing a challenge-response authentication,
providing notification to prompt confirmation of a diagnosis port on the bus,
providing notification to prompt a driver of the vehicle, in which the onboard network system is installed, to stop or to drive slowly,
providing notification to prompt the driver of the vehicle, in which the onboard network system is installed, to go to a dealer,
providing notification to the driver of the vehicle, in which the onboard network system is installed, that the unauthorized state is occurring,
providing notification to the electronic control unit connected to the bus that a data frame having a particular identifier is unauthorized,
transmitting notification to a server outside of the vehicle, in which the onboard network system is installed, that an unauthorized data frame is being transmitted,
providing notification to the vehicle or roadside device near the vehicle, in which the onboard network system is installed, that the unauthorized state is occurring,
switching the onboard network system to a fail-safe mode that has been set beforehand, and
recording as a log that the unauthorized state is occurring.

12. The unauthorized activity detection method according to claim 1, further comprising:
identifying, by the monitoring electronic control unit, a relation of content of data frames between data frames having identifiers different from each other by multivariate analysis based on a set of data frames received from the bus; and
generating or updating, by the monitoring electronic control unit, the unauthorized activity detection rule information, to indicate a condition representing the identified relation.

13. The unauthorized activity detection method according to claim 1, wherein a type of the content included in the first data frame is different from a type of the content included in the second frame.

14. The unauthorized activity detection method according to claim 1, wherein the first operational status and the second operation status are each directed to a movement operation of the vehicle.

15. The unauthorized activity detection method according to claim 1, wherein the first operational status is directed to a moving speed of the vehicle, and the second operational status is directed to an acceleration of the vehicle.

16. The unauthorized activity detection method according to claim 1, wherein the first operational status is directed to a moving speed of the vehicle, and the second operational status is directed to a gearshift position.

17. A monitoring electronic control unit connected to a bus in an onboard network system having a plurality of electronic control units that perform communication via the bus, the monitoring electronic control unit comprising:
   a receiver that sequentially receives data frames from the bus;
   a storage that stores
      unauthorized activity detection rule information indicating a condition regarding a relation in content between a first data frame having a first identifier and a second data frame having a second identifier that differs from the first identifier, and
      a frame reception history, which include information relating to contents of the data frames that the receiver has successively received; and
   circuitry that, in operation, performs operations including determining whether or not the data frames received from the bus by the receiver satisfies the condition indicated by the unauthorized activity detection rule information by referencing the frame reception history,
   wherein content of the first data frame includes a value indicating a first operational status of a vehicle, in which the onboard network system is installed, and content of the second data frame includes a value indicating a second operational status of the vehicle,
   wherein the plurality of electronic control units exchange the data frames following a Controller Area Network protocol via the bus,
   wherein the unauthorized activity detection rule information indicates a first condition in relation of content of data fields between a first type of frame and second type of frame, the first type of frame being a data frame having the first identifier and the second type of frame having the second identifier different from the first identifier,
   wherein, in the determining, a determination is made regarding whether the first type of frame and the second type of frame satisfy the first condition indicated by the unauthorized activity detection rule information;
   wherein the operations further include:
      calculating a degree of abnormality relating to a transmission of the first type of frame, in accordance with a count of conditions determined as not being satisfied in the determining, the count of conditions being out of the first condition and a second condition further indicated by the unauthorized activity detection rule information to be a condition regarding relation of content of data frames between the first type of frame, and a third type of frame that is a data frame having a third identifier that is different from the first identifier and the second identifier; and
      transmitting a predetermined data frame to be receivable by an electronic control unit transmitting the first type of frame, in a case where the degree of abnormality calculated in the calculating satisfies a predetermined abnormality condition, and
   wherein, in the determining, determination is further made regarding whether or not the first type of frame and the third type of frame received satisfy the second condition indicated by the unauthorized activity detection rule information.

18. An onboard network system having a plurality of electronic control units that perform communication via a bus, the onboard network system comprising:
   a receiver that sequentially receives data frames from the bus;
   a storage that stores
      unauthorized activity detection rule information indicating a condition regarding a relation in content between a first frame having a first identifier and a second frame having a second identifier that differs from the first identifier, and
      a frame reception history, which include information relating to contents of the data frames that the monitoring electronic control unit has successively received; and
   circuitry that, in operation, performs operations including determining whether or not a set of data frames received from the bus satisfies the condition indicated by the unauthorized activity detection rule information by referencing the frame reception history, to determine whether or not an unauthorized state has occurred,
   wherein content of the first data frame includes a value indicating a first operational status of a vehicle, in which the onboard network system is installed, and content of the second data frame includes a value indicating a second operational status of the vehicle,
   wherein the plurality of electronic control units exchange the data frames following a Controller Area Network protocol via the bus,
   wherein the unauthorized activity detection rule information indicates a first condition in relation of content of data fields between a first type of frame and second type of frame, the first type of frame being a data frame having the first identifier and the second type of frame having the second identifier different from the first identifier,
   wherein, in the determining, a determination is made regarding whether the first type of frame and the second type of frame satisfy the first condition indicated by the unauthorized activity detection rule information;
   wherein the operations further include:
      calculating a degree of abnormality relating to a transmission of the first type of frame, in accordance with a count of conditions determined as not being satisfied in the determining, the count of conditions being out of the first condition and a second condition further indicated by the unauthorized activity detection rule information to be a condition regarding relation of content of data frames between the first type of frame, and a third type of frame that is a data frame having a third identifier that is different from the first identifier and the second identifier; and
      transmitting a predetermined data frame to be receivable by an electronic control unit transmitting the first type of frame, in a case where the degree of abnormality calculated in the calculating satisfies a predetermined abnormality condition, and
   wherein, in the determining, determination is further made regarding whether or not the first type of frame and the third type of frame received satisfy the second condition indicated by the unauthorized activity detection rule information.

* * * * *